(12) United States Patent
Wiebe et al.

(10) Patent No.: US 9,304,605 B2
(45) Date of Patent: Apr. 5, 2016

(54) GENERAL INFORMATION MANAGEMENT SYSTEM

(75) Inventors: Linus Wiebe, Lund (SE); Christer Fåhraeus, Bjarred (SE); Petter Ericson, Malmo (SE)

(73) Assignee: Anoto AB, Lund (SE)

( * ) Notice: Subject to any disclaimer, the term of this patent is extended or adjusted under 35 U.S.C. 154(b) by 2021 days.

(21) Appl. No.: 12/335,141

(22) Filed: Dec. 15, 2008

(65) Prior Publication Data

US 2009/0182527 A1 Jul. 16, 2009

Related U.S. Application Data

(63) Continuation of application No. 09/746,506, filed on Dec. 22, 2000, now abandoned.

(60) Provisional application No. 60/177,310, filed on Jan. 21, 2000, provisional application No. 60/208,164, (Continued)

(30) Foreign Application Priority Data

| Dec. 23, 1999 | (SE) | 9904745 |
| Feb. 18, 2000 | (SE) | 0000541 |
| Mar. 21, 2000 | (SE) | 0000939 |
| Mar. 21, 2000 | (SE) | 0000952 |
| Apr. 5, 2000 | (SE) | 0001239 |
| Aug. 30, 2000 | (WO) | PCT/SE00/01667 |

(51) Int. Cl.
G06F 3/03 (2006.01)
G06F 3/0354 (2013.01)
G06F 17/30 (2006.01)

(52) U.S. Cl.
CPC .......... *G06F 3/0317* (2013.01); *G06F 3/03545* (2013.01); *G06F 17/30286* (2013.01)

(58) Field of Classification Search
USPC .................................. 345/179; 382/306, 232
See application file for complete search history.

(56) References Cited

U.S. PATENT DOCUMENTS 4,040,011 A * 8/1977 Crane et al. .................. 382/121
4,495,646 A 1/1985 Gharachorloo
(Continued)

FOREIGN PATENT DOCUMENTS

| CN | 1129889 A | 8/1996 |
| EP | 0 407 734 A1 | 1/1991 |

(Continued)

OTHER PUBLICATIONS

Mats-Petter Pettersson and Thomas Elsö, U.S. Appl. No. 60/157,967, filed Oct. 6, 1999.

(Continued)

*Primary Examiner* — Dorothy Harris
*Assistant Examiner* — Leonid Shapiro
(74) *Attorney, Agent, or Firm* — Finnegan, Henderson, Farabow, Garrett & Dunner LLP

(57) ABSTRACT

An information management system is intended for management of digitally represented information which is associated with absolute positions on an imaginary surface (200). The imaginary surface (200) contains at least two regions (201-208), each of which is dedicated to predetermined management of the digitally represented information. In the system the management of the digitally represented information is carried out on the basis of the region affiliation of the absolute positions associated with the information. The system is suitably based on use of a position-coding pattern which defines the imaginary surface (200) and which in parts is applicable on different bases. The system makes possible both digital recording of information and control of how the information thus recorded is to be managed.
A database, a method for management of information, a method for compiling a pattern layout, a product and use are also described.

14 Claims, 6 Drawing Sheets

Related U.S. Application Data filed on May 31, 2000, provisional application No. 60/208,169, filed on May 31, 2000, provisional application No. 60/208,170, filed on May 31, 2000, provisional application No. 60/210,654, filed on Jun. 9, 2000.

(56) References Cited

U.S. PATENT DOCUMENTS

| | | | |
|---|---|---|---|
| 5,012,049 A | | 4/1991 | Schier |
| 5,051,736 A | | 9/1991 | Bennett et al. |
| 5,063,600 A | | 11/1991 | Norwood |
| 5,194,852 A | | 3/1993 | More et al. |
| 5,428,805 A | | 6/1995 | Morgan |
| 5,442,147 A | | 8/1995 | Burns et al. |
| 5,449,896 A | | 9/1995 | Hecht et al. |
| 5,477,012 A | | 12/1995 | Sekendur |
| 5,515,491 A | | 5/1996 | Bates et al. |
| 5,652,412 A | | 7/1997 | Lazzouni et al. |
| 5,661,506 A | | 8/1997 | Lazzouni et al. |
| 5,784,485 A | | 7/1998 | Xu et al. |
| 5,790,105 A | | 8/1998 | Yoshikawa |
| 5,793,361 A | | 8/1998 | Kahn et al. |
| 5,815,142 A | | 9/1998 | Allard et al. |
| 5,842,196 A | | 11/1998 | Agarwal et al. |
| 5,852,434 A | | 12/1998 | Sekendur |
| 5,902,968 A | * | 5/1999 | Sato et al. ................. 178/19.01 |
| 5,932,863 A | | 8/1999 | Rathus et al. |
| 5,937,110 A | | 8/1999 | Petrie et al. |
| 5,983,277 A | | 11/1999 | Heile et al. |
| 6,072,917 A | | 6/2000 | Mori et al. |
| 6,081,261 A | | 6/2000 | Wolff et al. |
| 6,144,797 A | * | 11/2000 | MacCormack et al. ...... 386/224 |
| 6,195,570 B1 | | 2/2001 | Ishida |
| 6,208,771 B1 | | 3/2001 | Jared et al. |
| 6,252,948 B1 | | 6/2001 | Okamoto |
| 6,304,898 B1 | | 10/2001 | Shiigi |
| 6,310,988 B1 | | 10/2001 | Flores et al. |
| 6,327,395 B1 | | 12/2001 | Hecht et al. |
| 6,330,976 B1 | | 12/2001 | Dymetman et al. |
| 6,335,727 B1 | | 1/2002 | Morishita et al. |
| 6,345,304 B1 | | 2/2002 | Dymetman et al. |
| 6,502,756 B1 | | 1/2003 | Fahraeus |
| 6,529,645 B2 | | 3/2003 | Fåhraeus et al. |
| 6,564,252 B1 | | 5/2003 | Hickman et al. |
| 6,570,104 B1 | | 5/2003 | Ericson et al. |
| 6,577,299 B1 | * | 6/2003 | Schiller et al. ................ 345/179 |
| 6,594,406 B1 | * | 7/2003 | Hecht ........................... 382/306 |
| 6,625,314 B1 | * | 9/2003 | Okamoto ..................... 382/188 |
| 6,658,145 B1 | | 12/2003 | Silver et al. |
| 6,686,579 B2 | | 2/2004 | Fagin et al. |
| 6,752,317 B2 | | 6/2004 | Dymetman et al. |
| 6,985,643 B1 | | 1/2006 | Fahraeus et al. |
| 6,992,655 B2 | | 1/2006 | Ericson et al. |
| 7,176,896 B1 | | 2/2007 | Fahraeus et al. |
| 2001/0024193 A1 | | 9/2001 | Fahraeus |
| 2001/0035861 A1 | | 11/2001 | Ericson et al. |
| 2002/0091711 A1 | | 7/2002 | Ericson |
| 2003/0089781 A1 | | 5/2003 | Kia et al. |

FOREIGN PATENT DOCUMENTS

| | | |
|---|---|---|
| EP | 0 615 209 A2 | 9/1994 |
| GB | 2 306 669 A | 5/1997 |
| JP | 7-239745 | 9/1995 |
| JP | 10-187907 | 7/1998 |
| JP | 11-203381 | 7/1999 |
| WO | WO 97/22959 | 6/1997 |
| WO | WO 99/39277 | 8/1999 |
| WO | WO 99/50751 | 10/1999 |
| WO | WO 99/50787 | 10/1999 |
| WO | WO 99/56200 | 11/1999 |
| WO | WO 00/00928 | 1/2000 |
| WO | WO 00/31682 | 6/2000 |
| WO | WO 00/73983 | 12/2000 |
| WO | WO 01/26032 | 4/2001 |
| WO | WO 01/61449 A2 | 8/2001 |
| WO | WO 01/61450 A2 | 8/2001 |

OTHER PUBLICATIONS

XP002328425: Dymetman and Copperman, Intelligent Paper, Xerox Research Center Europe; published in Apr. 1998.

Office Action dated Mar. 23, 2009 in Canadian Application No. 2,394,922, 4 pgs.

Office Action dated Dec. 17, 2004 in Chinese Application No. 00817626.4, 5pgs.

Office Action dated Aug. 13, 2007 in European Application No. 00 989 150.8, 3 pgs.

Search Report dated Jul. 23, 2009 in European Application No. 09 152 107.0, 6 pgs.

Office Action dated Apr. 27, 2010 in European Application No. 09 152 107.0, 4 pgs.

Office Action mailed Oct. 2, 2002 in U.S. Appl. No. 09/652,838, 13 pgs.

Office Action mailed Apr. 24, 2003 in U.S. Appl. No. 09/652,838, 12 pgs.

Advisory Action mailed Sep. 24, 2003 in U.S. Appl. No. 09/652,838, 3 pgs.

Office Action mailed Feb. 2, 2004 in U.S. Appl. No. 09/652,838, 9 pgs.

Office Action mailed Jul. 13, 2004 in U.S. Appl. No. 09/652,838, 10 pgs.

Office Action mailed Feb. 8, 2005 in U.S. Appl. No. 09/652,838, 9 pgs.

Notice of Allowance mailed Nov. 17, 2005 in U.S. Appl. No. 09/652,838, 4 pgs.

Notice of Allowance mailed Oct. 2, 2006 in U.S. Appl. No. 09/652,838, 4 pgs.

* cited by examiner

GENERAL INFORMATION MANAGEMENT SYSTEM

This is a continuation of Application No. 09/746,506, filed Dec. 22, 2000 now abandoned and claims the benefit of U.S. provisional application No. 60/177,310, filed Jan. 21, 2000; U.S. provisional application No. 60/208,164 filed May 31, 2000; U.S. provisional application No. 60/208,169, filed May 31, 2000; U.S. provisional application No. 60/208,170, filed May 31, 2000; U.S. provisional application No. 60/210,654, filed Jun. 9, 2000, PCT/SE00/1667, filed Aug. 30, 2000; Swedish Application No. 0001239-3, filed Apr. 5, 2000; Swedish Application No. 0000952-2, filed Mar. 21, 2000; Swedish Application No. 0000939-9, filed Mar. 21, 2000; Swedish Application No. 0000541-3, filed Feb. 18, 2000; and Swedish Application No. 9904745-8, filed Dec. 23, 1999, all of which are incorporated herein by reference.

FIELD OF THE INVENTION

This invention relates to the field of management and communication of information.

BACKGROUND OF THE INVENTION

Information is often written down and communicated by means of pen and paper. Such paper-based information is, however, difficult to manage and communicate efficiently.

Computers are used to an increasing extent for managing and communicating information. The information is entered by means of a keyboard and stored in the computer's memory, for example on a hard disk. The entry of the information by means of the keyboard is, however, slow and it is easy to make mistakes. Nor is it particularly convenient to read large amounts of text on a computer screen. Graphical information, such as drawings or images, is usually entered by means of a separate image reader, such as a scanner or the like, in a procedure which is time-consuming, cumbersome, and as often as not gives unsatisfactory results. However, once the information is in the computer, it is easy to communicate it to others, for example as an e-mail or SMS via an Internet connection or as a fax via a fax modem.

In Applicant's Patent Application PCT/SE00/01895, which claims priority from Swedish Patent Application No. 9903541-2, filed on 1 Oct. 1999, and which is incorporated herewith by reference, a system is described where a pen and paper are used to write down information in the traditional way, while at the same time a digital graph is created consisting of several tracks or lines of the movement of the pen across the paper, which graph can be transmitted to a computer. Such a system combines the advantage of management with pen and paper, which many users are used to, with the computer's superior ability to communicate and store information. The sheet of paper is provided with a coding pattern, for example consisting of dots or other symbols. The pen has a sensor, preferably optical, which records the coding pattern and, by means of a mathematical algorithm, calculates the position of the pen on the coding pattern.

In this way, the traditional pen becomes an excellent input device for the computer, and the computer can be used to store the recorded information instead of the sheet of paper having to be archived in a file. In addition, the information can easily be communicated by means of the computer.

The recorded information contains parts which can be used for different purposes.

1) The digital graph contains an image, such as figures or interrelated lines, which can be interpreted by people, for example letters, a symbol, a figure or a drawing. This is the actual message which was written down and which the user wants to manage in some way, for example to archive or to send to a recipient. This information, so-called message information, is stored in some graphical format, for example a vector format or as a collection of pixels.

2) The part of the message information which consists of letters (handwritten) can be subjected to subsequent processing in the form of OCR interpretation (Optical Character Recognition) or ICR interpretation (Intelligent Character Recognition) for conversion into a character format which can be used by the computer, for example for searching purposes or for cataloguing. Symbols can also be interpreted, for example stenography symbols or icons, to which the user predefines a particular meaning. In the following, this information is called character information.

3) The information can also contain an identification of which pen was used to write down the information.

4) Finally, the graph contains information about where on the surface the graph was written down, so-called absolute position information.

5) In addition, a hard copy of the recorded information can be obtained, if the pen makes physical marks on the sheet of paper.

Prior-art technique comprises other systems for obtaining absolute or relative position information when writing on a surface. However, these previously known systems only describe the use of such information in order to create message information and/or character information, that is information belonging to the groups 1) and 2) above. Such prior art includes, for example, optical detection of a position-coding pattern on a base according to U.S. Pat. Nos. 5,051,736, 5,442,147, 5,852,434, 5,652,412 and EP-B-0 615 209. Position information can also, as also described in EP-B-0 615 209, be obtained by means of acceleration sensors, or by means of inductive/capacitive/magnetic sensors. Other alternatives are a base incorporating pressure sensors, as described in U.S. Pat. No. 5,790,105, triangulation of signals (light, sound, infrared radiation, etc.) with the use of a plurality of transmitters/receivers, as described in U.S. Pat. No. 5,012,049, or mechanical detection of movement relative to a surface, as described in U.S. Pat. No. 4,495,646. Position information can also be obtained by combinations of techniques. For example, a system is described in WO 00/31682 with combined optical detection of symbols for the determination of absolute position information at low resolution, and acceleration sensors, for the determination of relative position information at high resolution.

Although, according to prior art, there are several different techniques for recording message and/or character information as described above, there is no system for enabling the user to manage this information in a simple, flexible and structured way.

Known systems for managing information, such as the database system as described in U.S. Pat. No. 5,842,196, comprise as a rule a central server unit and user units in the form of personal computers or terminals, which communicate with the server unit. The server unit contains a database with information stored in data records. Searching these data records and updating the same with new information, are time-consuming operations which should be made as efficient as possible. For this reason the database is often organized in a tree structure, in which the data records, or data fields in these, are given searchable indices or key values. It is, however, unclear how this type of database system would be able to be combined successfully with the techniques for recording message and/or character information described above.

U.S. Pat. No. 5,932,863 describes a technique for improving the user interface to electronic media. Paper products are provided with a machine-readable symbol, which is allocated a pre-programmed command in a computer. When a user reads in the symbol by means of a hand-held scanner, this is transmitted to the computer, where the pre-programmed command is executed, for example to cause the computer to retrieve interactive software from a central databank and to execute this on the computer. Also in this case, it is unclear how this type of user interface would be able to be combined with the techniques for recording message and/or character information described above.

SUMMARY OF THE INVENTION

This invention relates to improving management of information which is recorded by means of a user unit. More specifically, it is an object of this invention to increase the possibilities of managing digitally-recorded information.

It is also desirable to show a technique for information management that is easy for the user to use.

A further object is to provide a technique which enables rapid, simple and unambiguous management of information.

It is also an object to provide a technique which is general, but which permits individual handling of different parties' information.

These and other objects will be apparent from the following description and claims.

According to a first aspect, the invention relates to an information management system.

According to prior-art technique, a position-coding pattern is used locally for the sole purpose of recording handwritten information. The position-coding pattern then needs only to be used to code positions locally on the writing surface on which the information is written. According to the invention, absolute positions are used instead on an imaginary surface which is made up of all the points or positions which can be coded by means of the position-coding pattern. Each position is defined by at least two coordinates. If there are several imaginary surfaces, a third coordinate can be used to define which imaginary surface is in question. By dedicating different parts of the imaginary surface to different types of information management, it is possible both to record information and to control how the information is to be managed by using the position-coding pattern. Different bases are thus provided with different subsets of the position-coding pattern, depending upon how the information which is written on the base is to be managed.

The position-coding pattern covers a total surface which is imaginary in as much as it is very large and is therefore never present in its entirety on a base. The imaginary surface is an imaginary surface which is made up by all the positions that the position-coding pattern can code. The imaginary surface can be divided into main regions, which in turn can be divided into subregions, which in turn can be divided into further subregions, etc. The main regions can be different sizes and shapes. Together they do not need to cover all of the imaginary surface, but they can do so. Each main region can be dedicated to a particular type of information management. The above-mentioned subregions can be dedicated to variants of the information management to which the associated main region is dedicated. The subregions can also be dedicated to different parties, products, services, operations on recorded information or the like.

It must be pointed out that not all of the information which is managed in the system needs to be represented by absolute positions on the imaginary surface. The information can be recorded by a combination of techniques, of which one identifies absolute positions and the other identifies relative positions. An example of such a combination is given in the above-mentioned WO 00/31682. In this case, the information may contain only one or a few absolute positions, and a sequence of local positions related to these absolute positions. As the local positions can be converted to absolute positions, such digitally represented information which is linked in some way to absolute positions on an imaginary surface can also be managed in the system according to the invention.

The system thus increases the possibilities of managing information. A user can write down and at the same time digitally record information on a position-coding pattern. The management of the information recorded digitally in this way is then controlled by where on the imaginary surface the information is recorded. The system thus permits information gathering, that is digital recording of information which is written down on a writing surface or the like, and information distribution, that is communication of information to and from a user. All or parts of the digitally recorded information, for example in the form of message information, can be sent to a recipient. Alternatively, a user can be sent further information from a particular party, for example about a product or service, by recording information on a part of the imaginary surface designed for the purpose.

The system is thus easy to use, as the user does not himself need to define in each situation how the recorded information is to be managed. The management is controlled instead by the coordinates of the recorded information, that is its region affiliation on the imaginary surface. The user can work largely as he does at present with paper and pen, but still make use of all the possibilities of electronics. The recorded information can be managed quickly, easily, unambiguously and transparently for the user in the system according to the invention.

The system according to the invention is general, but permits individual handling of different parties' information, thanks to the fact that different parties with different needs can be given access to different regions on the imaginary surface in the system and can control how their own information is to be managed.

As an example, it can be mentioned that a main region can be dedicated to information which is to be sent to a predetermined address in a computer network.

As another example, it can be mentioned than another main region can be dedicated to information in the form of notes which are to be stored in a user's computer.

Different regions on the imaginary surface can be dedicated to different purposes for different periods of time. Different regions can be reserved by a party for different periods of time, for special markets and for special applications.

The system can be called global, in that the division of the imaginary surface into different unique regions is applied throughout the whole system, which, however, does not need to be global in the sense that it is world-wide.

The global information management system can be said to arise and exist when any party utilizes the property of a position-coding pattern that different coordinate areas or regions which are coded by different subsets of the pattern can be dedicated to different management of information purposes.

In a preferred embodiment, the information management system comprises a computer system which stores information about the position of the different regions on the imaginary surface. The computer system can comprise one or more computers which store the above-mentioned information. What is essential is to keep track in a coordinated way of where the different regions are located so that the regions are utilized consistently in the system. Information is also suitably stored concerning unused or unreserved regions and concerning what the different reserved regions are dedicated to.

In one embodiment, at least one command region which represents an operation is defined on the imaginary surface, so that detection of the absolute coordinates for a point within this command region results in the initiation, and later execution, of said operation.

In addition to the regions which are dedicated to different management of information purposes, there can thus be one or more command regions on the imaginary surface. The former regions are used to record information which is processed in different ways depending upon the region. The command region is used principally not for recording information but to define a command or an operation which is to be carried out. The command region can in the extreme case comprise a single point, as the command region does not need to make possible recording of handwritten information. In the normal case, however, the command region comprises a plurality of points on the imaginary surface for a corresponding subset of the position-coding pattern to be read off with high reliability. The command or operation is typically intended to be carried out with regard to information which has been or which is to be recorded by means of a subset of the position-coding pattern which codes one of said regions which are dedicated to different management of information purposes.

According to one example, a user writes information on a notepad, the writing surface of which has a writing field provided with a first subset of the position-coding pattern, which first subset codes coordinates within a region on the imaginary surface dedicated to notes. Thereafter the user records absolute coordinates from a command region, which is coded by a second subset of the position-coding pattern, which second subset is reproduced in a box on the writing surface of the notepad. The command can, for example, be to store the recorded information in the user's computer, in which case the box is marked "store". As will be described in greater detail below, the detection of the second subset of the position-coding pattern results in the information written on the first subset being stored in the user's computer.

What was described above regarding the regions for information management also applies to the command regions.

The command region can be a universal region on the imaginary surface, that is a corresponding subset of the position-coding pattern can be applied on a number of different bases and combined with other subsets of the position-coding pattern associated with other regions on the imaginary surface.

Alternatively, the command region can be part of one of the above-mentioned regions for information management, for example, a primary region which is dedicated to transmission of information to an external unit. The primary region also suitably contains at least one message recording region, which is dedicated to digital recording of a sequence of positions on the imaginary surface. The primary region suitably contains a plurality of identical standard regions, each of which comprises at least one command region and at least one message recording region. The primary region is thus hierarchically structured, which has the advantage that detailed information about this part of the imaginary surface can be stored in compact form, for example as an algorithm-based database. In addition all information which is recorded within a standard region is considered to belong together, which can be an advantage when the recorded information is to be managed in the system.

In a preferred embodiment, the information about the position of said at least one command region on the imaginary surface is stored in the above-mentioned computer system, so that information is collected about where all the different regions on the imaginary surface are positioned and consistent utilization is made possible.

The command or operation which is defined by the command region can, for example, be one of the commands to store information, to send information or to convert information. The information can be sent in different formats and via different "transport systems". The information can, for example, be sent as an e-mail message, as an SMS or as a fax. It can be sent from a user unit, for example in the form of a digital pen, via for example a mobile phone, a computer or a PDA to a recipient which, for example, can also be a mobile phone, a PDA, a computer, in particular a computer connected to the Internet, or a program in a computer.

The information is sent preferably in graphical form, that is as sequences of recorded positions. All the recorded positions which represent information can be sent, or they can be processed into a compressed form or some other format. Character recognition can also be carried out, so that the information can be sent in character-coded format.

The information can be stored in a unit which is synchronized with the user unit, for example a computer, or at a storage location on a server connected to the Internet.

The conversion command can comprise a command which means that the information, for example, is to be translated into a predetermined language, subjected to character-recognition, encrypted, or converted in some other way.

It does not need to be a single party that administers all the information management in the information management system, but different parties can have access to different regions on the imaginary surface. The party that is responsible for the information management system must, however, as mentioned earlier, know which regions on the imaginary surface are reserved and which are free. The computer system stores advantageously information about an owner of at least one of said information management regions.

In addition, the computer system can need to comprise information about what particular information management regions and command regions are dedicated to, so that the computer system can carry out part of the information management. Particular information which is represented by coordinates of positions within particular regions can, for example, always be sent to the computer system, which can carry out particular processing of the information and then forward it to a recipient.

In a preferred embodiment, the information management system can also comprise at least one user unit, preferably in the form of a hand-held device, such as a digital pen, which is arranged to record absolute positions from a base provided with at least one subset of said position-coding pattern, which subset can also be regarded as at least one subset of the imaginary surface.

The user unit can comprise a sensor which can detect the position-coding pattern. As mentioned above, the information can alternatively be recorded by a combination of techniques, in which case the user unit can comprise an additional one or more sensors, for example, an acceleration sensor, a mechanical translation sensor, etc.

The user unit can advantageously also have an ordinary pen point, so that information can be written on a base which is provided with a subset of the position-coding pattern and can at the same time be recorded digitally by the sensor. The information which is recorded by the user unit in the form of absolute positions thus usually represents message information, that is graphical information which is written/drawn on the base using the user unit. However, it can alternatively represent a command (an operation).

When a command is detected, it causes the user unit to at least initiate a predetermined operation, possibly however with a certain delay. In certain cases the user unit can carry out the whole operation itself. In other cases the user unit can, for example, transfer all or parts of the recorded information and information about which operation is to be carried out to an external unit, for example a computer or mobile phone, which completes the operation. This transmission can be carried out directly or at a later time. By "initiate" is meant here that the user unit ensures that the operation is carried out, even though it does not carry out the operation itself, so that the user does not need to give further commands to the user unit or the external unit in order for the operation to be carried out. However, the user many need to supply further information or to confirm the operation/the information. In its simplest embodiment, the user unit is not able to recognize or interpret the coordinates corresponding to different command regions, but it ensures that a required operation is carried out by sending all the coordinates to an external unit which can interpret them.

The information management system can also advantageously comprise at least one base which is provided with at least one subset of said position-coding pattern. The base can constitute or be incorporated in a number of products. Examples of such products are forms, brochures, newspapers, notepads, calendars, desk mats, etc, of paper or plastic material, a writing board of plastic material or a display screen. Products which are particularly suitable for being provided with coordinates are all forms of products with writing surfaces. The writing surfaces do not need to be suitable for writing with an ordinary pen point, but can be writing surfaces on which writing is carried out by the pen being moved as in writing. The products are provided with different subsets of the position-coding pattern, depending upon how the information is to be managed.

According to a second aspect, the invention relates to a database which contains information about the above-mentioned imaginary surface. In the database at least one position on the imaginary surface is allocated a rule for information management, so that information which is associated with the absolute coordinates for said at least one position is managed on the basis of this rule.

This database can, in the information management system described above, be stored in its entirety in a central administration unit and/or be divided between a plurality of units. Different types of database structures can be used in different units. All types of conventional database structures can be used, for example relational, network-based, or hierarchical structures. In a user unit, which generally has limited memory and processor capacity, the database structure is preferably algorithm-based.

The data base suitably contains further information associated with positions on the imaginary surface, such an owner, a recipient address, an encryption instruction, a link to a program or document file to be executed or to be sent to a recipient, etc.

The advantages of the database according to the invention are apparent from the above description of the system.

According to a third aspect, the invention relates to a method for managing information, the advantages of which are apparent from the above description of the system.

According to a fourth aspect of the invention, this relates to a method for compiling a pattern layout which is intended for application on a product.

The method permits a party or user to create a pattern layout that can be used for digital recording and management of information in a system or method according to the invention. The advantages of this method are apparent from the above description of the system.

According to a fifth aspect of the invention, this relates to a product which is intended to be used in an information management system as described above. The product has a message field which is provided with a first subset of the position-coding pattern to enable digital recording of graphical information which is written on said first subset, and a command field which is provided with a second subset of the position-coding pattern, which second subset defines an operation which is to be carried out concerning the recorded graphical information.

The advantages of this product are apparent from the above description of the system.

According to a sixth aspect of the invention, this relates to use of positions on at least one imaginary surface divided into regions for control of management of information. There is a rule associated with each region for how information which contains the coordinates of at least one position within the region is to be managed.

The advantages of this use are apparent from the above description of the system.

BRIEF DESCRIPTION OF THE DRAWINGS

This invention and its distinctive features, objects and advantages will be described in greater detail in the following with reference to the accompanying drawings, which for the purpose of exemplification show currently preferred embodiments.

DESCRIPTION OF PREFERRED EMBODIMENTS

By way of introduction, the overall construction of an information management system according to the invention will be described, with reference to FIGS. 1 and 2. Thereafter components which are part of the system will be described, among other things with reference to FIG. 3, and a number of examples of applications with reference to FIG. 2. This is followed by examples of different forms of communication and localized data processing in the information management system. Finally, a more detailed example is given of the layout of the imaginary surface which is part of the information management system, with reference to FIGS. 4-6.

Figure 1:
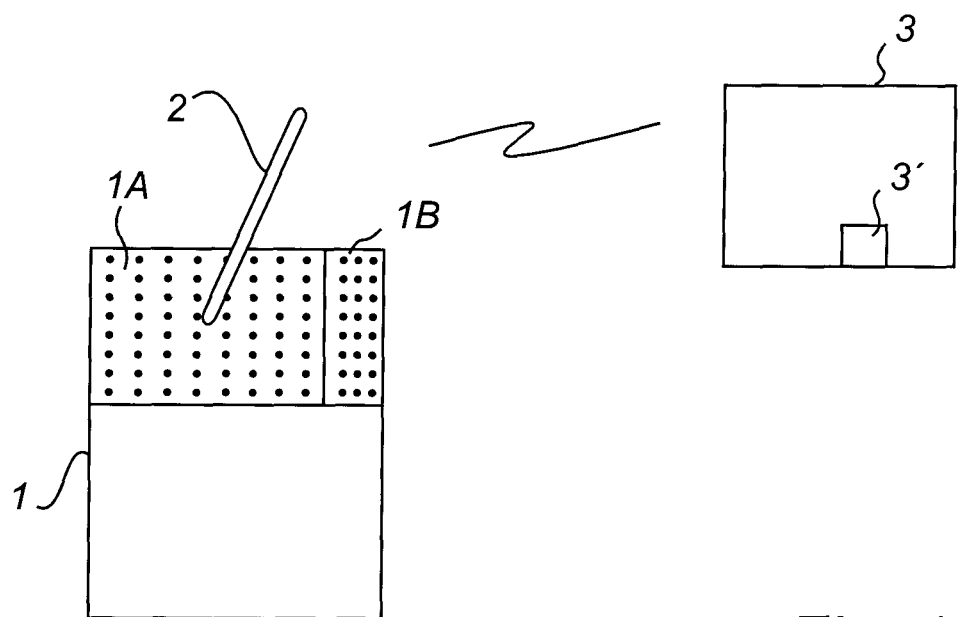
FIG. 1 is a schematic diagram that shows an information management system according to the invention.

FIG. 1 shows an example of how a system according to the invention can be constructed. The system comprises principally a plurality of products, a plurality of user units and one or more external units. For the sake of clarity, however, only one product 1, one user unit 2 and one external unit 3 are shown in FIG. 1.

The product 1 in FIG. 1 is provided with a message field 1A to receive graphical information, for example text, numbers or figures, which are written using the user unit 2, and a command field 1B for initiating/implementing different operations using the user unit 2.

The system permits structured management of the information which a user records on the product 1 using the user unit 2. The product 1 is provided with a position-coding pattern which is interpreted by the user unit 2 as absolute coordinates on the surface of the product 1. The position-coding pattern, which is described in greater detail below, is such that it codes positions on a total surface or imaginary surface which is much larger than the surface of the product 1. When the user passes the user unit 2 across the surface of the product 1, information is recorded containing one or more pairs of absolute coordinates. This recorded information is communicated, automatically (on-line) or upon command, to the external unit 3 for storage and/or processing.

In the system according to the invention, management of the recorded information is dependent upon where on the imaginary surface the information has been recorded, that is the coordinate content of the recorded information.

This system permits structured processing of information. Different parties with different needs can have access to different parts of the imaginary surface and can control how their own information is to be managed. The system is general but also permits individual management of different parties' information.

Figure 2:
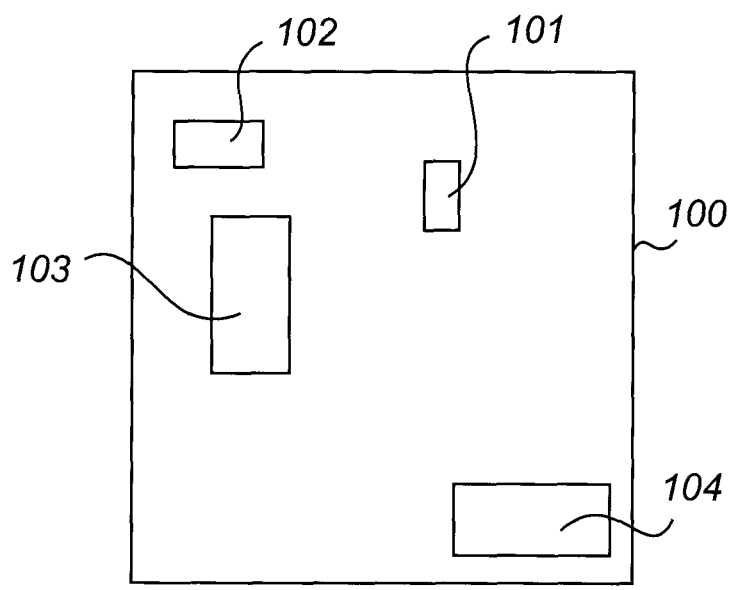
FIG. 2 is a schematic diagram that shows a first imaginary surface with main regions that are dedicated to different purposes.

FIG. 2 shows schematically an example of an imaginary surface 100 which consists of or is made up by all the points or positions whose absolute coordinates a position-coding pattern can code.

Four different coordinate areas or main regions 101-104 are defined on the imaginary surface 100. The main regions 101-104 are different sizes and different shapes. They are spaced from each other and do not overlap. The main regions can in turn be divided into subregions (not shown), which in turn can be divided into further subregions, etc.

The main regions can be more or less regular in shape, not only rectangular as shown in the example, and the relationship between the size of the main regions and the size of the imaginary surface can be completely different to the one shown. Nor do the regions need to be separated from each other, but can physically overlap each other and be defined by mathematical relations or associations.

The different main regions 101-104 are dedicated to different purposes. In this example, the first main region 101 can be dedicated to recording notes, the second main region 102 can be dedicated to recording calendar information, that is information which is to be stored associated with a particular time or a particular interval of time, the third main region 103 can be dedicated to recording handwritten information which is always to be sent to a predetermined server unit on the Internet and the fourth main region 104 can be dedicated to one or more specific commands.

In an actual information management system the number of dedicated main regions can be much larger.

Information about the extent of the imaginary surface and about the location and extent of the different main regions which have been dedicated to different information management purposes or different commands, which are to be carried out with regard to the information which is managed in the system, is stored completely or partially in one or more computer systems, for example the external unit 3 in FIG. 1. Said computer system can be a passive part of the information management system. It does not need to carry out any part of the actual information management and thus does not need to be connected to the other units in the information management system. The computer system is, however, suitably an interacting part of the information management system, as will be shown in greater detail below.

The Position-Coding Pattern

The information management system is based, as shown above, on use of a position-coding pattern. This pattern can be constructed in various ways, but has the general property that if an arbitrary part of the pattern of a particular minimum size is recorded, then the position of this part in the position-coding pattern can be determined unambiguously.

The position-coding pattern can be of the type which is disclosed in the above-mentioned U.S. Pat. No. 5,852,434, where each position is coded by a specific symbol.

It is, however, desirable for the position-coding pattern to be used to record information at high resolution and in addition to be used in a system which permits varied processing of the information. Therefore the pattern should be designed in such a way that it can code a very large number of positions given by pairs of absolute coordinates. In addition, the position-coding pattern should be coded graphically in such a way that it does not dominate or interfere with the visual impression of the surface of the product. It should also be possible to detect the position-coding pattern with high reliability.

Therefore the position-coding pattern is advantageously of the type which is disclosed in the Published International Patent Application WO 00/73983 filed on 26 May 2000, or in the International Patent Application PCT/SE00/01895 filed on 2 Oct. 2000, both applications being assigned to the present Applicant. In these patterns each position is coded by a plurality of symbols or marks, and each symbol contributes to the coding of several positions. The position-coding pattern is constructed of a small number of types of symbols.

An example is shown in PCT/SE00/01085 where a larger dot represents a "one" and a smaller dot represents a "zero".

The currently most preferred pattern is shown in PCT/SE00/01895, where four different displacements of a dot or mark in relation to a nominal raster point code four different values. This pattern is constructed of small dots at a nominal spacing of approximately 0.3 mm. Any part of the pattern which contains 6×6 such dots defines a pair of absolute coordinates. Each pair of absolute coordinates is thus defined by an approximately 1.8 mm×1.8 mm large subset of the position-coding pattern. By means of determination of the position of the 6×6 dots on the sensor in the user unit which is used to read off the pattern, an absolute position on the imaginary surface can be calculated by interpolation with a resolution of approximately 0.03 mm. A more complete description of the position-coding pattern according to PCT/SE00/01895 is given in the Appendix.

This position-coding pattern is able to code a large number of absolute positions. As each position is coded by 6×6 dots, each of which can have one of four values, $4^{36}$ positions can be coded, which with the above-mentioned nominal distance between the dots corresponds to a surface of 4.6 million km².

The position-coding pattern can be printed on any base which allows a resolution of approximately 600 dpi. The base can be any size and shape, depending upon its planned use. The pattern can be printed by standard offset printing technology. Ordinary black carbon-based printing ink or some other printing ink which absorbs infrared light can advantageously be used. This means that other inks, including black ink which is not carbon-based and which does not absorb infrared light, can be used to superimpose other printing on the position-coding pattern without interfering with the reading off of this.

A surface which is provided with the above-mentioned pattern printed with a carbon-based black printing ink will be perceived by the eye as only a pale gray shading of the surface (1-3% density), which is user-friendly and esthetically pleasing.

Of course, fewer or more symbols can be used to define a position than described above, and larger or smaller distances between the symbols can be used in the pattern. The examples are only given to show a currently preferred realization of the pattern.

The position-coding pattern described above can be applied on all imaginable products on which information is to be recorded by the recording of coordinates. Examples of such products are forms, notepads, calendars, desk mats, writing boards, etc. The products can be different materials, such as paper, plastic, etc. Alternatively the position-coding pattern can be integrated into or arranged upon a computer screen. As a result, different positions on the screen can be read off by means of a digital pen which detects the pattern. In this way a screen is provided with the same function as a touch screen, but with the advantages that it is unaffected by the environment and that the screen can be bent. The position-coding pattern can alternatively be displayed electronically on a computer screen. The currently most preferred embodiment is, however, that the pattern is applied onto paper.

The User Unit

Figure 3:
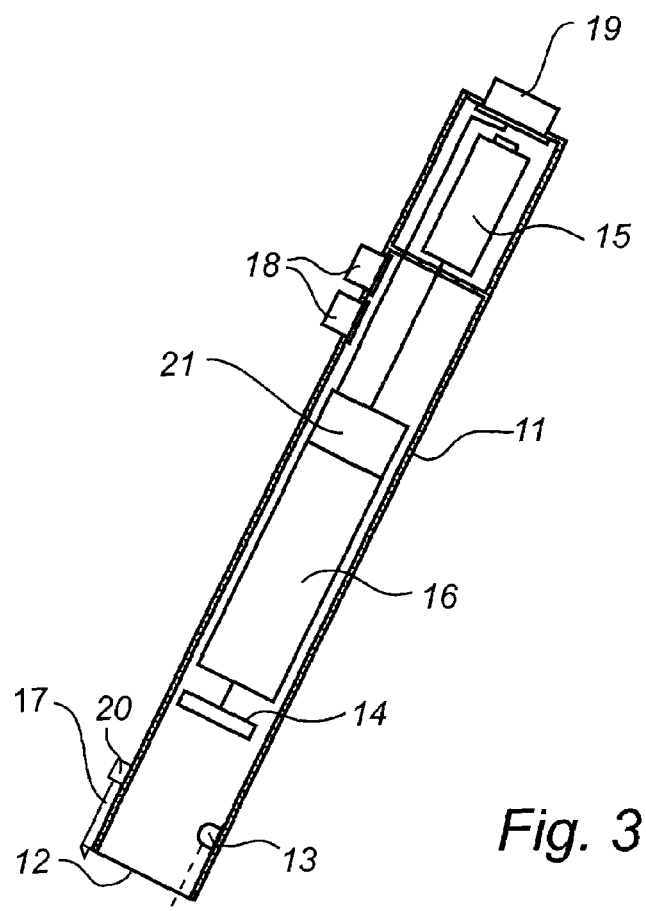
FIG. 3 is a schematic internal view of a digital pen which can be used in an information management system according to the invention.

FIG. 3 shows an example of a user unit, which in a preferred embodiment is used to record electronically graphical information which is produced on a writing surface and to initiate/execute commands or operations on this information.

The user unit comprises a casing 11 which is the same shape as a pen. A short side of the casing defines an opening 12 and is intended to be held in contact with or a short distance from a base provided with a position-coding pattern.

The user unit, below called a digital pen, contains essentially an optics part, an electronic circuitry part and a power supply.

The optics part forms a digital camera and comprises at least one infrared light-emitting diode 13 for illuminating the surface which is to be imaged and a light-sensitive area sensor 14, for example a CCD or CMOS sensor, for recording a two-dimensional image. The pen may also contain a lens system (not shown). The infrared light is absorbed by the symbols in the position-coding pattern and in this way makes them visible to the sensor 14. The sensor records advantageously at least 100 images per second.

The power supply for the pen is obtained from a battery 15 which is mounted in a separate compartment in the casing. Alternatively, however, the pen can be connected to an external power source.

The electronic circuitry part comprises a signal processor 16 for determining a position on the basis of the image recorded by the sensor 14 and more specifically a processor unit with a microprocessor which is programmed to read in images from the sensor and to determine in real time absolute coordinates for points on the imaginary surface on the basis of the imaged subset of the position-coding pattern. In an alternative embodiment, the signal processor 16 is realized as an ASIC (Application Specific Integrated Circuit) or an FPGA (Field Programmable Gate Array).

The position determination is thus carried out by the signal processor 16, which thus must have software to enable it to locate and decode the symbols in an image and to enable it to determine positions from the codes thus obtained. A person skilled in the art would be able to design such software from the description in the above-mentioned Patent Applications WO 00/73983 and PCT/SE00/01895.

The signal processor 16 can also have limited information about the different regions of the imaginary surface and about what these are dedicated to. The signal processor 16 can, for example, advantageously contain information which makes it possible for it to recognize that certain points or regions on the imaginary surface represent certain commands or operations which are to be initiated and/or implemented, for example with regard to information which has been or will be recorded. Preferred commands which can be recognized by the pen are "store", "send", "to do", "address" and other similar basic commands. The pen has advantageously indicating means (not shown), for example a light-emitting diode, a buzzer or a vibrator, which gives a signal when the pen detects a command. The signal serves to make the user aware that a command has been recorded. Of course these indicating means can also be used to give an indication that the pen has recorded handwritten information.

The pen can advantageously also contain information which makes it possible for it to distinguish between, for example, information which is to be stored in the pen, information which is to be transferred to the user's personal computer, information which is to be sent to a fax number via a modem and information which is to be sent to a server at a predetermined IP address.

More specifically, as described above, a main region on the imaginary surface can be dedicated in order that information which is recorded by means of a subset of the position-coding pattern which corresponds to this main region, and is thus represented by coordinates for points which lie within the main region will always to be sent to said IP address for further management.

The digital pen comprises in this embodiment a pen point 17, using which the user can carry out ordinary pigment-based writing on the surface provided with the position-coding pattern. The pen point 17 can be extended and retracted so that the user can control whether or not it is to be used. A button (not shown) for extending and retracting the pen point, in the same way as in an ordinary ball-point pen, can also function as an on/off button for the pen, so that the pen is activated when the pen point is extended.

The digital pen can also comprise buttons 18 by which it is activated and controlled. It also has a transceiver 19 for short-distance wireless transmission, for example using infrared light or radio waves, of information to and from the pen. In the currently most preferred embodiment the transceiver 19 is a Bluetooth® transceiver.

The digital pen is also suitably provided with a pressure sensor 20 which measures the pressure on the pen point 17 when this is used.

The signal processor 16 can comprise software which determines the angle between the pen point and the paper and also the rotation of the pen on the basis of the recorded images. Software for this purpose is described in Applicant's Swedish Patent Application No. 0000952-2.

In a preferred embodiment, the signal processor 16 determines the following information on the basis of each recorded image: a pair of coordinates, the angle between the pen and the paper, the rotation of the pen, the pressure on the paper and in addition a time-stamp on the basis of the time of the recording of the image. Depending upon how the information management system is constructed, it can, however, be sufficient to record the pair of coordinates, possibly together with one of the other parameters.

The recorded pair of coordinates can be processed and stored in a compressed format. The signal processor 16 can, for example, be programmed to analyze a sequence of pairs of coordinates and convert these into a train of polygons which constitutes a description of how the pen has been moved across the surface which is provided with the position-coding pattern.

All the recorded data can be stored in a buffer memory 21 awaiting transmission to an external unit. The digital pen can thereby work in stand-alone mode, that is the pen sends the information when it has the opportunity, for example when it makes contact with an external unit, whereupon it retrieves recorded information from the buffer memory 21. It must also be pointed out that the signal processor 16 does not need to forward all the information to an external unit, but can be programmed to analyze the recorded coordinates and only to forward information which is represented by coordinates within a particular coordinate area. The information can also be forwarded immediately on-line.

The signal processor 16 can also have software for encrypting the information which is sent to external units.

The pen can have, but thus does not need to have, knowledge of what all the different regions on the imaginary surface are dedicated to. In fact, no individual unit in the system needs to have this knowledge, but it can be distributed over a number of different units. For the administration of the system there should, however, be gathered knowledge of which main regions (and subregions thereof) are already dedicated and which main regions (and subregions thereof) are free. However, only the party that at the time has the sole right to use a particular region (main region or subregion) has information about its precise use. Of course, as an alternative, all information can be collected in a central unit, such as in a memory 3' of the unit 3 in FIG. 1.

It is also desirable for only simpler, less time-consuming and memory-intensive processing of the recorded information and processing of security-sensitive information to be carried out in the pen. More complicated processing can be carried out in a local computer, with which the pen communicates and in which software is installed for processing information from the pen, and/or in a server unit which can contain very powerful software for, among other things, character recognition (OCR), a larger amount of memory, for example for database information, and faster signal processors for more advanced processing of the information.

Such distribution of the information processing makes it possible to manufacture pens at a relatively low cost. In addition, new applications can be added to the information management system without the existing pens needing to be upgraded. Alternatively, the user can update his pen at regular intervals so that it receives information about new dedicated regions and about how information which is related to these regions is to be managed and also new functionality.

The above example is only given to show a currently preferred realization of the digital pen. In an alternative embodiment, the pen operates only as an image generator, that is the images recorded by the sensor 14 are transmitted to an external unit, for example a computer, which processes the images to determine the coordinates as above, and which communicates if necessary with other external units.

In the embodiment above, the pattern is optically readable and the sensor is thus optical. The pattern can, however, be based on a parameter other than an optical parameter. In such a case the sensor must of course be of a type which can read the parameter concerned. Examples of such parameters are chemical, acoustic or electromagnetic marks. Capacitive or inductive marks can also be used. However, it is preferable for the pattern to be optically readable, as it is then relatively simple to apply it onto different products and in particular onto paper.

Examples of Applications in the Information Management System

In the following, the information management system according to the invention is illustrated by means of a number of examples of applications with reference to the imaginary surface in FIG. 2.

The applications in an information management system according to this invention can be divided into three groups or types: 1) Applications with analogue input signal and digital output signal; 2) Communication applications and 3) Service applications.

Applications belonging to the first group use the digital pen and a writing surface with a position-coding pattern principally for inputting of information to a computer, a PDA or a mobile phone.

A product with a writing surface, for example a notepad, can be provided on the actual writing surface with a position-coding pattern taken from a first region, which pattern codes coordinates for points within a main region which is dedicated to notes, such as the main region 101 in FIG. 2. The product can also be provided with a box which is marked "store" and contains a position-coding pattern from a second main region which is dedicated to commands, such as the main region 104 in FIG. 2.

When the user writes on the writing surface, the pen records a representation of what is written in the form of a sequence of pairs of coordinates for points within the first region on the imaginary surface by continually recording images of that part of the position-coding pattern which is within the field of view of the pen. The pen stores these absolute coordinates in its buffer memory. When the user then places the pen in the box marked "store" or ticks this box, the pen records coordinates for at least one point in the main region 104 and stores these in the buffer memory. At the same time the pen notes that these coordinates represent a command. In the pen's memory it is stored that precisely this command (will be explained in greater detail below) means that the information is to be stored in a nearby computer. As soon as the pen starts communicating with the computer with which it is synchronized, the pen transfers the recorded coordinate information to the computer via its transceiver. The computer stores the received information as an image, which for example can be displayed directly on the computer's screen. Searching the stored information can be carried out afterwards on the basis of the time of storing (or recording) the information and on the basis of key words which were written in capital letters on the writing surface and which could thus be stored in character-coded format (ASCII) after character recognition (OCR).

Other commands which can be found on a product of the type described above are, for example, "address book", which is a box provided with a different subset of the position-coding pattern which codes a subregion of the main region 104, which subregion is dedicated to an address book command. When the pen recognizes the coordinates for this command, it sends address information which was written by hand, for example in capital letters, on a subset of the position-coding pattern intended for this purpose to the computer which stores the address information in a digital address book. Different subregions of the subregion dedicated to the address book command on the imaginary surface can be dedicated to different address information.

Information with a content which requires interpretation in order for certain measures to be carried out in the system is currently written preferably in capital letters in special character recognition fields, so-called "combs", which are provided with a subset of the position-coding pattern which is dedicated to character interpretation. This means that the user is caused to write legible characters, which facilitates their interpretation.

The communication applications, that is applications belonging to the second group above, are somewhat more demanding. They also usually require access to the Internet. Loose pages, pages in a calendar, a notebook or the like can be designed as forms for the transmission of graphical e-mail, SMS, fax or the like. Fields are printed on the page which are intended for indication of address, subject and message text. Address and subject are intended to be written in capital letters so that they can easily be converted into character-coded format and can be understood by other digital units which are designed for managing information in character-coded format. The information in the message field can consist of any graphical information. The page is also provided with a tick box which, when it is ticked, causes the pen to make contact via its transceiver with the mobile phone with which it is synchronized. The mobile phone identifies the message as a graphical e-mail message which is intended for a predetermined server unit which is incorporated in the information management system. The identification can be carried out by means of information which is stored in the pen, or in some unit with which the mobile phone is in communication, while the mobile phone preferably only functions as a link or a modem. The mobile phone transfers the message to the base station by the use of GSM or GPRS, etc, and then by means of TCP/IP to the predetermined server unit which decodes the address field and sends the message via the Internet to the addressee. A confirmation of delivery can be sent to the mobile phone and shown on its display.

The above-mentioned page can be provided with a subset of the position-coding pattern which codes a main region on the imaginary surface which is dedicated to transmission of (graphical) e-mail. Different parts of this main region can then represent the different fields and the tick boxes. This type of hierarchical layout of a main region will be described in greater detail below with reference to FIGS. 5-6.

Alternatively, the different fields and tick boxes can be provided with different subsets of the position-coding pattern which code coordinates for points within main regions on the imaginary surface which are dedicated to address information, subject indication, transmission, etc. This type of general layout of main regions on the imaginary surface will be described in greater detail below with reference to FIG. 4. The advantage of using a universal "send" box is that this can then be represented by the same subset each time it is used, irrespective of whether it is, for example, on a note sheet or on an e-mail form. This is more economical with the available imaginary surface. Another advantage is that the decoding in the pen is simple, as the pen only needs to recognize that it is a "send" box that has been ticked, whereupon the pen is to initiate an operation.

The service applications, that is those belonging to the third group above, are applications where the information management is controlled via one or more predetermined server units. An example is an advertisement in a newspaper which is provided with a subset of the position-coding pattern, which codes coordinates for points within a main region on the imaginary surface which is dedicated to information which is to be sent to a predetermined server unit. This particular subset codes coordinates for points within a particular subregion of the main region, to which subregion the advertiser has acquired the sole right. As is apparent from this, there can thus be larger main regions on the imaginary surface which are dedicated to a particular information management purpose. These main regions can then be subdivided into subregions to which different parties can have the sole right. In the server unit, which in this example also administers the main regions, it is noted which party has the right to the different subregions. A subset of the position-coding pattern can thus also make possible identification of an owner of the subregion within which the pattern codes points.

In the case of the advertisement, a user can place an order using his digital pen by specifying a recipient address in the field intended for this and by ticking a "send" box. If the order requires a payment to be made, a credit card number can be given. If the order is for the user, no recipient address needs to be given as an address for the pen previously stored can be used. If the order concerns a gift to another recipient, a handwritten greeting to the recipient can be added in a writing area for free-form graphical information in the advertisement.

When the user ticks the "send" box, the user unit 2 identifies that information was recorded within the main region 104 and therefore sends the recorded information to the predetermined server unit on the Internet. In the server unit it is determined that the recorded information is situated in a particular subregion, whereupon the owner of this subregion is identified. Thereafter the decoded information, together with any greeting, is sent to the owner who handles the delivery of the ordered product or service.

Communication Between the Pen and External Units

Certain operations can be carried out in their entirety by the pen itself, for example storing of a note in the pen and input of information for a user program in the pen. These operations can always be carried out by the pen in stand-alone mode.

Other operations require communication with the outside world. These operations can be commenced in stand-alone mode, but are not completed until the pen is connected to the outside world. Alternatively, the operations can be carried out on line.

In local applications, for example recording of notes or calendar notes, the pen communicates suitably directly with a local unit, such as a computer, mobile phone or PDA.

In communication and service applications, the pen can transmit the recorded information, suitably together with information about which operation is to be carried out, to a nearby computer which, for example, arranges the information as an e-mail message and sends this to a predetermined address or to an address which is recorded by the pen. Alternatively, the pen can communicate directly via its transceiver with a nearby external unit, for example a fax machine, printer or the like, which is also provided with a transceiver, in order to cause this to carry out the required operation utilizing the recorded information.

Alternatively, the pen can communicate via its transceiver with a mobile phone, which acts as a modem for the pen, for forwarding the recorded information to, for example, a server unit, another mobile phone or a fax machine.

As a further example, the pen can comprise or be integrated in a mobile phone transceiver so that it can carry out the operations which require communication directly.

In the above, wireless transmission of information from the pen is described. However, the transmission can alternatively be via cables. For example, the user unit 2 can be connected via a cable to a network connection unit, such as a mobile phone, a PDA, a computer or some other suitable unit which has an interface to a computer network, for example the Internet or a local company network. Alternatively, the network connection unit can be designed as a docking unit (not shown) which can be connected via cables to a communication network, such as a telephone network or a computer network. Such a docking unit can advantageously be designed as a pen stand. When the pen is placed in the docking unit, the pen is caused, automatically or upon command, to communicate with the outside world. The docking unit can also be designed to charge the battery 15 (FIG. 3) in the pen. According to another alternative, the docking unit is designed to establish wireless connection with the outside world.

The above communication can be achieved by a subset of the position-coding pattern coding coordinates for points within a main region on the imaginary surface which is dedicated to the pen sending all the recorded information, or parts thereof, to the external unit when it detects coordinates within this main region. The pen can be arranged to send information to the external unit immediately or after a particular period of time. Alternatively, the pen can send the information after the detection of a "send" box. The "send" box can, in this case, be located within said main region, the pen storing information which relates coordinates within this main region to the address of the external unit, for example, its Bluetooth® address.

Alternatively, as discussed above, the "send" box can be located in a special command region, the "send" box being allocated an instruction which causes the pen to send information to the external unit. In this case, no main region is required which is dedicated to sending recorded information to the external unit, as the information can, for example, be recorded in a writing field whose position-coding pattern codes coordinates for points within a main region which is dedicated to handwritten notes, an address field whose position-coding pattern codes coordinates for points within a main region which is dedicated to OCR interpretation, etc. Accordingly, the pen only needs to store information which relates coordinates within the "send" box or a subregion with several different command boxes, to the address of the external unit.

Information Processing in the System

The recorded information can be processed in the system according to the invention. The processing can be implemented in different parts of the system, depending upon the application and/or capabilities of communication with external units.

The recorded information can be finally processed in the pen itself.

Alternatively, only preliminary processing can be carried out in the pen, such as decoding of a recorded image into a pair of coordinates, compression of the recorded information or conversion in the form of character interpretation, translation, encryption, etc. The recorded information can then be sent to a local unit for processing in this, for example a local computer or a PDA. The local unit can contain information about the imaginary surface, or at least part thereof, and can be designed in such a way that, in response to the receipt of the recorded information, it identifies to which region its coordinates belong and determines, based on the region affiliation, how the information is to be processed. Alternatively, the pen contains such information about the imaginary surface, or a part thereof, that it is able to identify to which region the coordinates belong and to determine, based on the region affiliation, how the information is to be processed. In this case, the pen suitably sends a processing instruction to the local unit.

The recorded information can alternatively be processed by an external service provider that only has information about its part of the imaginary surface. Such an external service provider, which has the sole right to a part (main region/subregion) of the imaginary surface and does not have information about other parts, can, for example, be a telecommunications operator which provides communication services or a company which offers goods or services via advertisements.

The pen can contain information to the effect that a particular part of the imaginary surface belongs to such an external service provider, in which case the pen sends the recorded information directly to this service provider for further processing.

Alternatively, the pen can be designed to send the recorded information to a predetermined central unit, typically a server unit, which contains information about all or parts of the imaginary surface. The central unit can be arranged to identify, in response to the receipt of the recorded information, to which region its coordinates belong and to determine, based on the region affiliation, how the information is to be processed. The central unit can then forward the information to the external service provider. Alternatively, the central unit can implement the service or communication application in question.

According to a further alternative, the pen can be designed to send the recorded information, preferably only one or a few pairs of coordinates thereof, to a look-up unit, typically a server unit or a local computer, which contains information about all or parts of the imaginary surface. In this embodiment, the look-up unit is designed to identify, in response to the receipt of information from the pen, to which region the received information belongs and to return to the pen an address for the external service provider which is allocated the identified region. The pen is designed to send the recorded information to this address for final processing, in response to the receipt of the address.

Detailed Example of Imaginary Surface

Figure 4:
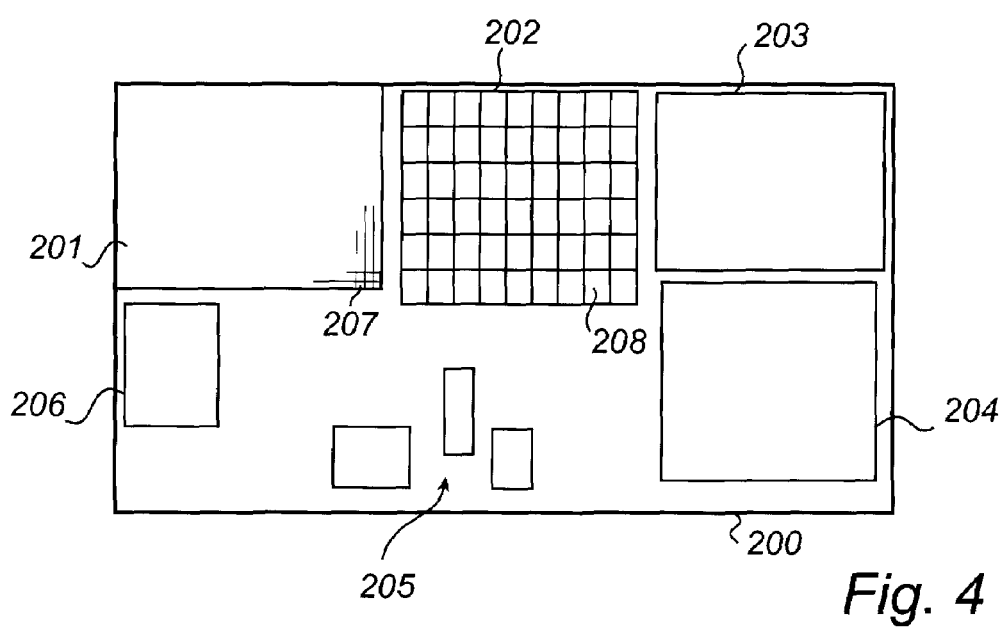
FIG. 4 is a schematic diagram that shows in greater detail a second imaginary surface with main regions that are dedicated to different purposes.

FIG. 4 shows schematically, in a similar way to FIG. 2, an imaginary surface 200 which constitutes or is made up by all the points or positions whose absolute coordinates can be coded by a position-coding pattern. A number of different main regions 201-206 are defined on the imaginary surface 200. The main regions are in general divided into subregions (not shown), which in turn can be divided into further subregions, etc.

In the discussion of the embodiment shown in FIG. 4 it is assumed that the total surface 200 is made up of pairs of x-y-coordinates of binary type, that is consisting of ones and zeros, where the pairs of coordinates have a length of 36 bits for both the x-coordinate and the y-coordinate. The position-coding pattern thus codes coordinates which make up an imaginary surface with 436 points or positions. The number of positions in this example can possibly be increased further by interpolation.

In the example according to FIG. 4, a "send" region 201 is dedicated to be used for the generation of "send" commands from the digital pen. The "send" region can, for example, be defined as all pairs of coordinates whose x-value starts with 0001 and whose y-value starts with 0001. For example, the four first bits in a pair of coordinates thus indicate its affiliation to a main region. With a division according to this example, 256 main regions are obtained.

In the example concerned, the four first bits thus indicate the main region affiliation, and a particular number of the last bits indicates the size of the subregions in the main region. In the "send" region 201, the size of the subregions 207 is the minimum, a so-called atom, consisting of 64*64 positions or corresponding to the six last bits. With a distance of approximately 0.3 mm between the dots in the position-coding pattern, this corresponds to a pattern surface of approximately 20*20 mm². The other 26 bits (36-4-6) address the different subregions 207 (corresponding to a "send" box) in the "send" region. The total number of subregions is then $4^{26}$, that is over 4500 billion (4 503 599 627 370 496). Each subregion 207 ("send" box) can thereby be identified by a number which consists of the 5th to the 30th bit of the x- and y-coordinates. The four first bits in each recorded pair of coordinates thus indicate in which main region the pen is situated, the following 26 bits identify a subregion (for example, a particular "send" box) within the main region, and the six last bits indicate where in the subregion the pen is situated.

These "send" boxes suitably belong to different recipients in a network which is connected to an information management system according to this invention. Information about such affiliation is stored in the information management system, either in the pen itself or in an external unit communicating with the pen, such as a local computer, a mobile phone or a server unit.

The second main region 202 is dedicated to notepad information and also comprises a large number of subregions 208 (corresponding to writing fields). Information about the position of these subregions 208 is preferably stored in a computer with which one or more pens communicate, or in the pens themselves. The position of the subregions 208 is predetermined, so that all users of the system know in advance that notes made in these subregions 208 belong to the main region 202 which is dedicated to the notepad.

For the notepad region 202 it is desirable that each subregion 208 (writing field) is larger than an A4 page, for example approximately 1 m² in size, corresponding to approximately 12 bits, to provide for essentially all formats of notepad. The number of subregions 208 (writing fields) in the main region 202 for the notepad is thus equal to $4^{20}$, that is approximately 1 billion (1 099 511 627 776).

The third main region 203 is dedicated to general availability. Information about the position of this main region is stored in a server unit with which one or more pens communicate. No user can reserve any part of this main region for his own use. This main region can also be divided into subregions, but the user can also decide for himself the sizes of the subregions.

The fourth main region 204 is, in contrast to the general main region 203, dedicated to giving the owner exclusive availability, that is the subregions are assumed only to be available for one pen at a time or in the way determined by the owner. Information about the position of this main region 204 and its subregions is stored in a server unit with which one or more pens communicate. The fact that the owner can reserve parts of this main region for his own use means that collisions are avoided, as two or more pens cannot simultaneously use an identical copy of the same part of the printed position-coding pattern which makes up this main region, or at least that the owner has full control over this.

A large number of private subregions in one or more private main regions 205 can be regarded as subscription objects, that is they can be reserved for a user for a shorter or longer period of time. Information about the positions of the main regions 205 or their subregions can be stored, together with the identity of a pen, in a server unit with which one or more pens communicate. In principle each person and each company in the world can have their own private area (subregion) with a size of 1 m².

The sixth main region 206 is intended to be available for local management of communication between a pen and a local computer, without necessarily having to be in contact with a computer/server unit in a network. Since the pen suitably communicates directly with the local computer, the pen should contain information about the position of this main region 206.

Of course, this can be achieved by the pen containing information about the division of all the imaginary surface. It is, however, desirable to minimize the information that must be stored in the pen, as this means lower requirements for memory in the pen and greater speed for its data processing.

Figure 5:
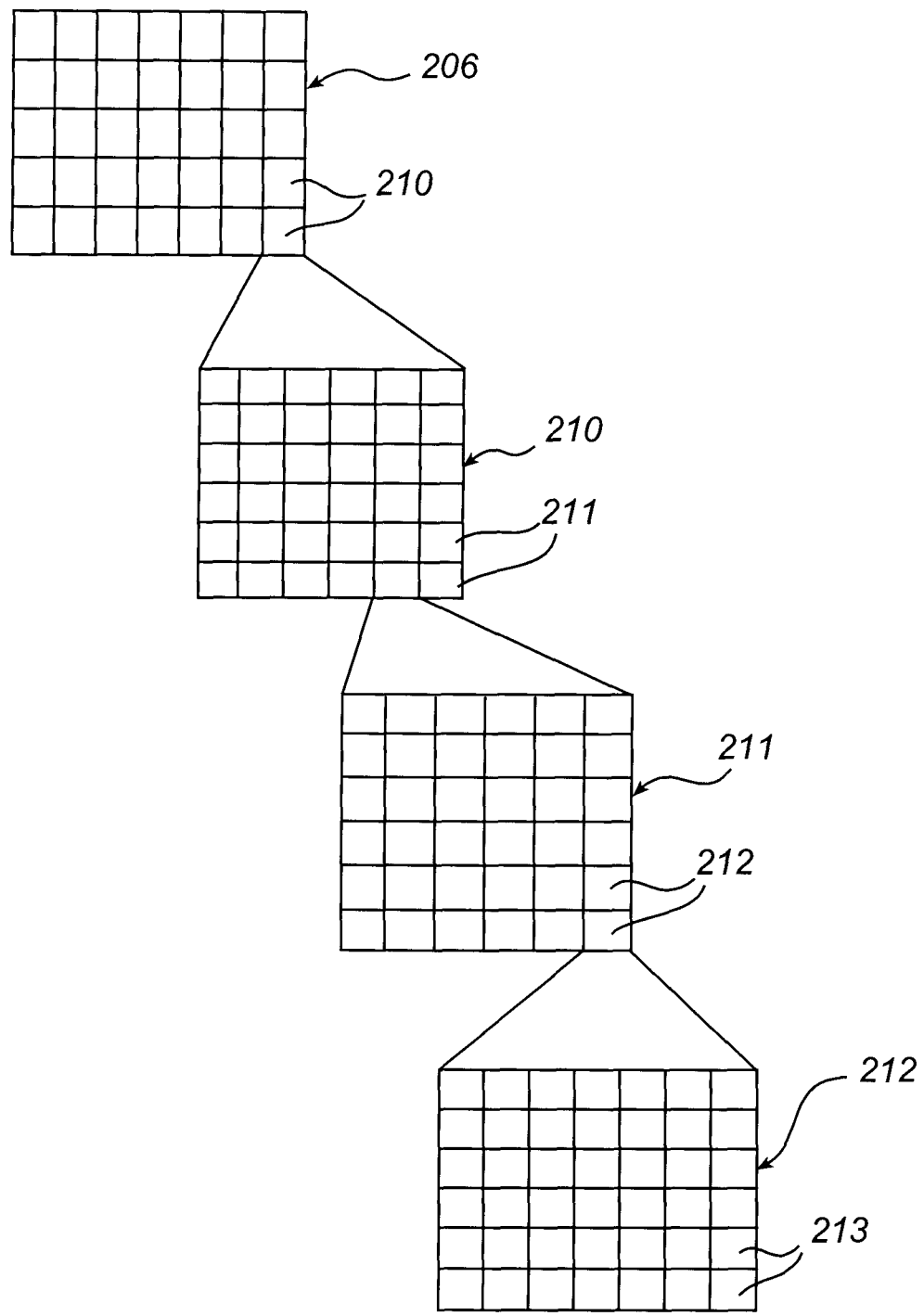
FIG. 5 is a schematic diagram that shows in greater detail subregions in a hierarchically organized main region on the imaginary surface in FIG. 4.

A preferred structure for the main region 206 intended for local communication is shown in FIG. 5 and described below. It must, however, be pointed out that the structure described below can equally well be used for service and communication applications, particularly when there is a need for the pen to be able to carry out operations itself on the recorded information and it must therefore contain detailed information about the imaginary surface.

In the embodiment according to FIG. 5, the main region 206 is divided into subregions 210-213 which contain basic elements in the form of pages 213. Each page 213 is a particular size and has a number of fields for predefined information management, as will be described in greater detail in connection with FIG. 6. For example, each main region 206 can be divided into a number of sections 210, each of which is divided into a number of shelves 211, each of which is divided into a number of books 212, each of which contains the above-mentioned pages 213. At a particular level within the subregions 210-212, all the pages 213 have an identical size and layout. For example, the sections 210 can contain different pages, while each section 210 contains shelves 211 and books 212 with identical pages 213. Alternatively, each section's 210 shelves 211 can contain different pages 213, while all books 212 within each shelf 211 have identical pages 213. Alternatively, the different books 212 can contain different pages 213, while the pages within each book 212 are identical. As a further alternative, the whole main region 206 can, of course, contain identical pages 213 in all the subregions 210-212.

The embodiment with a large number of identical pages permits the use of a simplified, preferably algorithm-based, database in the pen's memory. The pen stores a number of page templates, which define the size and layout of the pages for the different subregions 210-212 in the main region 206. Such a page template can be allocated to the highest subregion level which contains identical pages. With such a reduced database the pen can independently and quickly calculate which information is to be sent to the local computer, for example all information which has been recorded on one or more pages. Suitably each section, shelf, book and page has an identifying designation, for example a number. A particular subregion, for example a page, can thus be addressed simply by giving a sequence of numbers, as follows: section.shelf.book.page. For example, 35.100.4.0 can be interpreted as all the pages in book number 4 on shelf number 100 in section number 35. In addition, the different fields on each page can be addressed in a corresponding way: section.shelf.book.page.field.

Each section 210 can be dedicated to a particular type of information management, for example notes, calendar information, etc. Within each section one or more shelves, books or pages can be allocated to an owner. For example, a calendar manufacturer can lease a shelf with 1024 books with 16384 pages of A9 format.

Alternatively, each hierarchically organized main region can be dedicated to a particular type of information management, for example notepads, calendars, graphical messages, etc, or for a particular owner. It is realized that each such main region can be divided into any number of subregion levels.

As mentioned above, each section 210, shelf 211, book 212, page 213 or field can be allocated particular properties. In addition to the above-mentioned layout of the pages, these properties can, for example, indicate how long the pen is to store information which has been recorded without having been sent to an external unit, for example the above-mentioned local computer. Other properties can be that all recorded information is to be sent to a predetermined address, for example a Bluetooth® node, that all recorded information is to be character-interpreted (ICR), that all recorded information is to be sent directly, that is without the recording of a "send" box.

Each page 213 is coded by a subset of the position-coding pattern, which subset is intended to be applied onto the surface of the intended product. This subset can be applied either continuously or discontinuously on the surface of the product, as will be explained in greater detail with reference to FIG. 6 which shows an example of the layout of a page 213 on the imaginary surface. The example shown is not restricted to recording of information which is to be stored in a local computer, but also makes possible communication and service applications.

Figure 6:
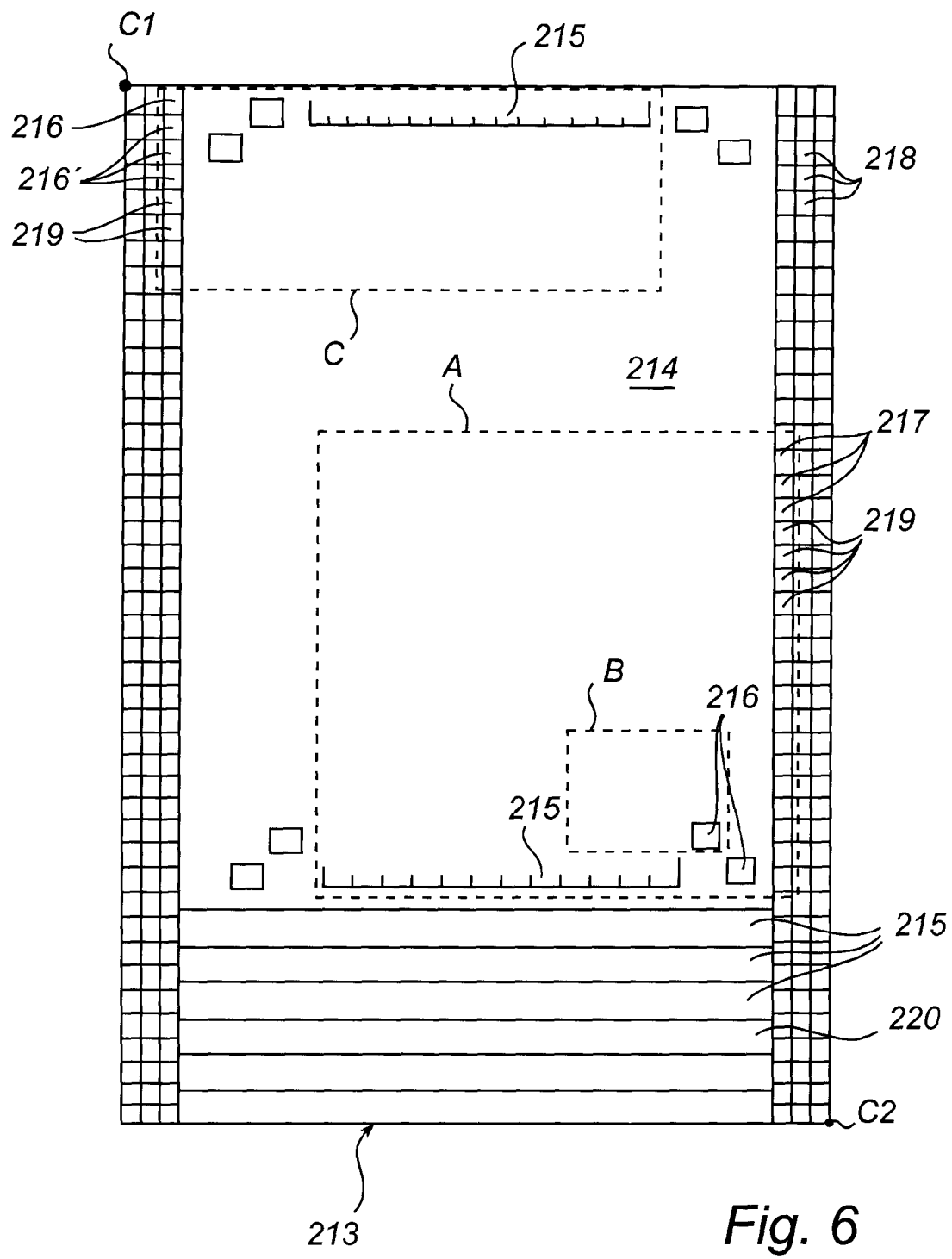
FIG. 6 is a schematic diagram that shows an example of the layout of the subregions at the lowest level of the main region in FIG. 5.

The page 213 in FIG. 6 is rectangular, and can thus be identified by the coordinates for two opposite corner points, C1, C2. The page 213 contains a number of fields 214-220 with completely or partially predetermined function.

A central writing field 214 is dedicated to recording of graphical information. ICR fields 215 are dedicated to character interpretation of the information recorded therein, where one or more ICR fields can be predefined to concern address information, for example an e-mail address, a fax number or a street address or can be dedicated to decoding only numbers or only letters. "Send" boxes 216 are dedicated to initiating sending of recorded information, where certain "send" boxes can have predefined properties, for example initiating the sending of an e-mail message, a fax message or an SMS message. If a general "send" box 216 is used, this can instead be allocated service selection fields 216', which indicate the different "transport systems" that can be used, for example e-mail, fax or SMS. Local command fields 217 are dedicated to initiating operations in the pen's memory, for example to delete all previously recorded information on the page in question from the pen's memory, to compress existing information in the pen's memory, to insert a bookmark in order to make possible the recreation of the sequence of coordinates which was recorded in the writing field when the bookmark was recorded, or to show previously recorded information on the page in question on a display, for example on a mobile phone or a local computer. The property field 218 is dedicated to initiating sending of information stored in the pen to an external unit, for example a local computer or a server unit. Such a property field 218 can, for example, initiate sending of the user's credit card number, postal address, e-mail address, etc. General command fields 219 are dedicated to initiating operations which are common to many different applications, for example, that the information which is to be sent is to be encrypted or allocated a particular priority, or that the information recorded in the writing field 214 is to be given certain visual properties, for example regarding color, line thickness or line type, which is reproduced when the information recorded in the writing field 214 is displayed, for example on a computer screen, or when it is printed out. A signature field 220 is dedicated to recording pairs of coordinates, the angle between the pen and the base, the rotation of the pen and the pressure on the base.

In the example above, the page 213 thus contains a plurality of message fields, such as writing field 214, ICR field 215 and signature field 220, a plurality of command fields, such as "send" boxes 216, local command fields 217, property fields 218 and general command fields 219, and a plurality of selection fields 216', for example for choice of service.

The pen can, as mentioned above, store information about the page 213 in the form of an algorithm-based page template. More specifically, the different fields 214-220 can be identified as one or more positions on the page 213. For example, each "send" box can have a particular extent and can be located in a particular position on each page 213. Similarly, each ICR field can have a particular extent and a particular position on each page 213.

An advantage of this type of hierarchical structure is that the pen can identify and initiate the operations which are indicated by the above fields 214-220 independently and simply. Thus the result of these operations can be shown to the user on a display, for example on a mobile phone, a computer or on or in association with the pen itself. The user has thus the opportunity to confirm that the result is correct before the recorded information is managed further in the system.

The owner of a particular page, book or shelf has the opportunity to design a product surface with a position-coding pattern, based on a page of the above-mentioned type. This can be carried out in two different ways.

The product surface can be constructed of a position-coding pattern which has a discontinuous layout.

This can be regarded as if all or parts of the different fields 214-220 on the above page 213 are "cut out" and arranged into a required appearance. The actual location of the fields on the product surface is thus not related to the position of the fields on the imaginary surface, as different subsets of the position-coding pattern on the surface of the product are taken from different parts of the imaginary surface.

Such a discontinuous layout makes possible any placing and dimensioning of different fields on the surface of the product, as position-coding patterns which code parts of a "send" box, a writing field, etc, can be located anywhere on the surface of the product. This case is analogous with what was described above in connection with the command regions in FIGS. 2 and 4.

The surface of the product can alternatively be constructed of a position-coding pattern which has a continuous layout. This can be regarded as if a part of the above page is "cut out" to create a finished layout, so that the whole surface of the product is provided with a position-coding pattern which codes coordinates for a continuous coordinate area on the imaginary surface. Three such layouts are indicated in FIG. 6 by broken lines. The reference A concerns a notepad page, the reference B concerns a note sheet of the type which is marketed under the trademark "Post-It", and the reference C concerns a form for sending any graphical message.

The continuous position-coding pattern is preferable in certain situations. The discontinuous layout of the position-coding pattern often requires the boundary between adjacent fields on the surface of the product to have no position-coding pattern for a certain distance, typically approximately 1 mm, so that the subsets which code coordinates on each side of the boundary can be detected unambiguously. Such boundary areas without position-coding pattern can be undesirable, particularly when the product is small. In these cases a continuous layout of the position-coding pattern can be preferable.

It must also be pointed out that when designing the surface of the product, regardless of whether the pattern layout is continuous or discontinuous, the owner can have the opportunity to define in detail what the properties of each field are to be.

With both continuous and discontinuous layouts of the position-coding pattern the advantage is obtained that the information which is to be sent to the external unit is defined by the corner points C1, C2 for the page concerned. The pen can thus, automatically or upon command, send to the external unit all information which has been recorded within the corner points C1, C2 on the imaginary surface.

A person skilled in the art will realize that there are many alternative ways of dividing the imaginary surface. It is common to the embodiments described above that different regions on the imaginary surface are dedicated to different purposes. In this way both recording of information and control of the management of information can be carried out.

Appendix

In the following the description is reproduced of a preferred position-coding pattern according to the International Patent Application PCT/SE00/01895.

Figure 7:
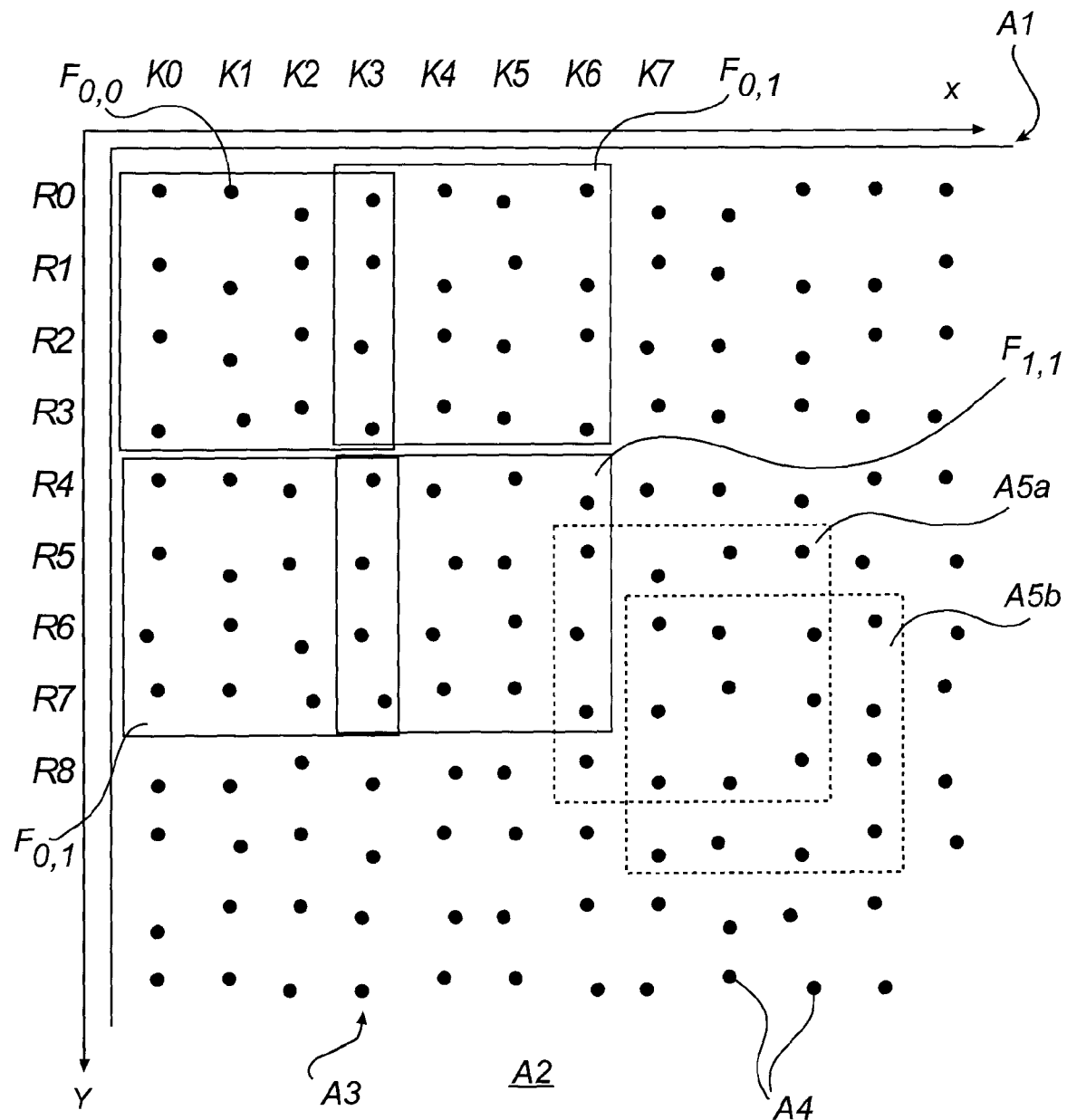
FIG. 7 is a schematic diagram that shows a product which is provided with a position-coding pattern according to a preferred embodiment.
Figure 8:
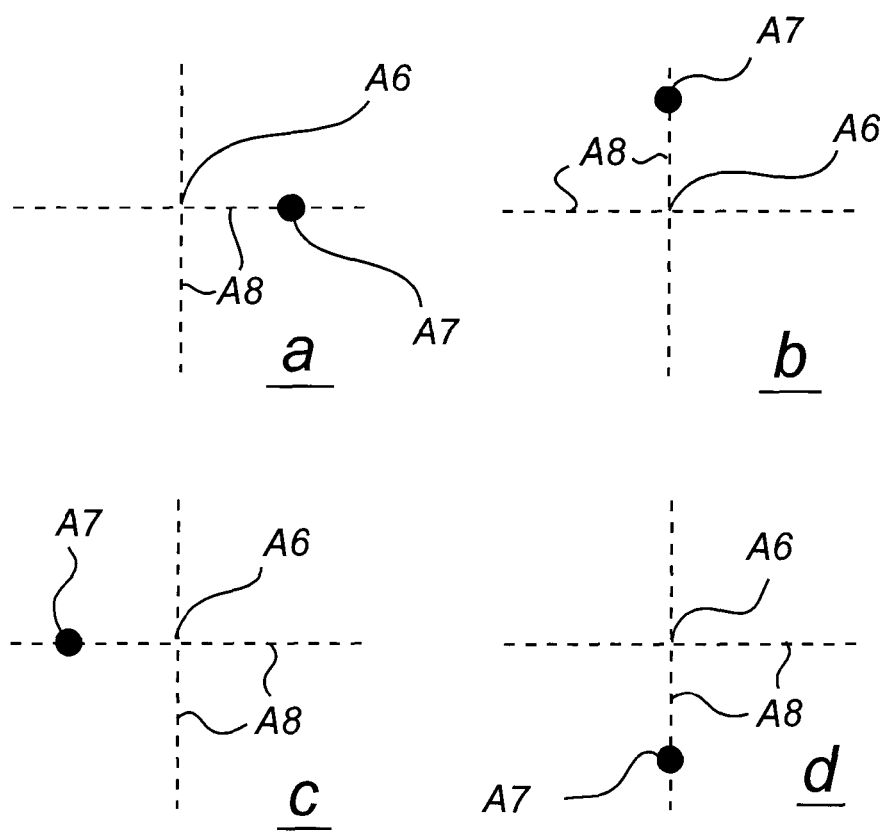
FIG. 8 is a schematic diagram that shows how the marks can be designed and positioned in a preferred embodiment of the position-coding pattern.

FIG. 7 shows a part of a product in the form of a sheet of paper A1, which on at least part of its surface A2 is provided with an optically readable position-coding pattern A3 which makes possible position determination.

The position-coding pattern comprises marks A4, which are systematically arranged across the surface A2, so that it has a "patterned" appearance. The sheet of paper has an X-coordinate axis and a Y-coordinate axis. The position determination can be carried out on the whole surface of the product. In other cases the surface which enables position determination can constitute a small part of the product.

The pattern can, for example, be used to achieve an electronic representation of information which is written or drawn on the surface. The electronic representation can be achieved while writing on the surface with a pen, by continually determining the position of the pen on the sheet of paper by reading off the position-coding pattern.

The position-coding pattern comprises a virtual raster, which is thus neither visible to the eye nor can be detected directly by a device which is to determine positions on the surface, and a plurality of marks A4, each of which, depending upon its position, represents one of four values "1" to "4" as described below. In this connection it should be pointed out that for the sake of clarity the position-coding pattern in FIG. 7 is greatly enlarged. In addition, only a part of the sheet of paper is shown.

The position-coding pattern is so arranged that the position of a partial surface on the total writing surface for any partial surface of a predetermined size is determined unambiguously by the marks on this partial surface. A first and a second partial surface A5a, A5b are shown by broken lines in FIG. 7. The second partial surface partly overlaps the first partial surface. The part of the position-coding pattern (here 4*4 marks) which is situated on the first partial surface A5a codes a first position, and the part of the position-coding pattern which is found on the second partial surface A5b codes a second position. The position-coding pattern is thus partly the same for the adjoining first and second positions. Such a position-coding pattern is called "floating" in this application. Each partial surface codes a specific position.

FIGS. 8a-d show how a mark can be designed and how it can be positioned relative to its nominal position A6. The nominal position A6, which can also be called a raster point, is represented by the intersection of the raster lines A8. The mark A7 has the shape of a circular dot. A mark A7 and a raster point A6 can together be said to constitute a symbol.

In one embodiment, the distance between the raster lines is 300 μm and the angle between the raster lines is 90 degrees. Other raster intervals are possible, for example 254 μm to suit printers and scanners which often have a resolution which is a multiple of 100 dpi, which corresponds to a distance between points of 25.4 mm/100, that is 254 μm.

The value of the mark thus depends upon where the mark is located relative to the nominal position. In the example in FIG. 8 there are four possible locations, one on each of the raster lines extending from the nominal position. The displacement from the nominal position is the same size for all values.

Each mark A7 is displaced relative to its nominal position A6, that is no mark is located at the nominal position. In addition, there is only one mark per nominal position and this mark is displaced relative to its nominal position. This applies to the marks which make up the pattern. There can be other marks on the surface which are not part of the pattern and thus do not contribute to the coding. Such marks can be specks of dust, unintentional points or marks and intentional marks, from for example a picture or figure on the surface. Because the position of the pattern marks on the surface is so welldefined, the pattern is unaffected by such interference.

In one embodiment, the marks are displaced by 50 μm relative to the nominal positions A6 along the raster lines A8. The displacement is preferably ⅙ of the raster interval, as it is then relatively easy to determine to which nominal position a particular mark belongs. The displacement should be at least approximately ⅛ of the raster interval, otherwise it becomes difficult to determine a displacement, that is the requirement for resolution becomes great. On the other hand, the displacement should be less than approximately ¼ of the raster interval, in order for it to be possible to determine to which nominal position a mark belongs.

The displacement does not need to be along the raster line, but the marks can be positioned in separate quadrants. However, if the marks are displaced along the raster lines, the advantage is obtained that the distance between the marks has a minimum which can be used to recreate the raster lines, as described in greater detail below.

Each mark consists of a more or less circular dot with a radius which is approximately the same size as the displacement or somewhat less. The radius can be 25% to 120% of the displacement. If the radius is much larger than the displacement, it can be difficult to determine the raster lines. If the radius is too small, a greater resolution is required to record the marks.

The marks do not need to be circular or round, but any suitable shape can be used, such as square or triangular, etc.

Normally, each mark covers several pixels on a sensor chip and, in one embodiment, the center of gravity of these pixels is recorded or calculated and used in the subsequent processing. Therefore the precise shape of the mark is of minor significance. Thus relatively simple printing processes can be used, provided it can be ensured that the center of gravity of the mark has the required displacement.

In the following, the mark in FIG. 8a represents the value 1, in FIG. 8b the value 2, in FIG. 8c the value 3 and in FIG. 8d the value 4.

Each mark can thus represent one of the four values "1 to 4". This means that the position-coding pattern can be divided into a first position code for the x-coordinate and a second position code for the y-coordinate. The division is carried out as follows:

| Mark value | x-code | y-code |
|---|---|---|
| 1 | 1 | 1 |
| 2 | 0 | 1 |
| 3 | 1 | 0 |
| 4 | 0 | 0 |

The value of each mark is thus converted into a first value, here bit, for the x-code and a second value, here bit, for the y-code. In this way two completely independent bit patterns are obtained by means of the pattern. Conversely, two or more bit patterns can be combined into a common pattern which is coded graphically by means of a plurality of marks in accordance with FIG. 8.

Each position is coded by means of a plurality of marks. In this example, 4*4 marks are used to code a position in two dimensions, that is an x-coordinate and a y-coordinate.

The position code is constructed by means of a number series of ones and zeros, a bit series, which has the characteristic that no four-bit-long bit sequence occurs more than once in the bit series. The bit series is cyclic, which means that the characteristic also applies when the end of the series is connected to its beginning. A four-bit sequence has thus always an unambiguously determined position number in the bit series.

The bit series can be a maximum of 16 bits long if it is to have the characteristic described above for bit sequences of four bits. In this example, however, only a seven-bit-long bit series is used, as follows:

"0 0 0 1 0 1 0".

This bit series contains seven unique bit sequences of four bits which code a position number in the series as follows:

| Position number in the series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

To code the x-coordinate, the bit series is written sequentially in columns over all the surface which is to be coded, where the left column $K_0$ corresponds to the x-coordinate zero (0). In one column the bit series can thus be repeated several times in succession.

The coding is based on differences or position displacements between adjacent bit series in adjacent columns. The size of the difference is determined by the position number (that is the bit sequence) in the bit series with which adjacent columns commence.

More specifically, if we take the difference $\Delta_n$ modulo seven between, on the one hand, a position number which is coded by a four-bit sequence in a first column $K_n$ and which can thus have the value 0 to 6, and, on the other hand, a position number which is coded by an adjacent four-bit sequence at a corresponding "height" in an adjacent column $K_{n+1}$, the difference will be the same regardless of where, that is at what "height", on the two columns the difference is taken. Using the difference between the position numbers for two bit sequences in two adjacent columns, it is thus possible to code an x-coordinate which is independent of and constant for all y-coordinates.

As each position on the surface is coded by a partial surface consisting of 4*4 marks in this example, there are four vertical bit sequences available and thus three differences, each with the value 0 to 6, for coding the x-coordinate.

The pattern is divided into code windows F with the characteristic that each code window consists of 4*4 marks. There are thus four horizontal bit sequences and four vertical bit sequences available, so that three differences can be created in the x-direction and four position numbers can be obtained in the y-direction. These three differences and four position numbers code the position of the partial surface in the x-direction and the y-direction. Adjacent windows in the x-direction have a common column, see FIG. 7. Thus the first code window $F_{0,0}$ contains bit sequences from the columns $K_0$, $K_1$, $K_2$, $K_3$, and bit sequences from the rows $R_0$, $R_1$, $R_2$, $R_3$. As differences are used in the x-direction, the next window diagonally in the x-direction and y-direction, the window $F_{1,1}$, contains bit sequences from the columns $K_3$, $K_4$, $K_5$, $K_6$, and the rows $R_4$, $R_5$, $R_6$, $R_7$. Considering the coding in just the x-direction, the code window can be considered to have an unlimited extent in the y-direction. Correspondingly, considering the coding in just the y-direction, the code window can be considered to have an unlimited extent in the x-direction. Such a first and second code window with unlimited extent in the y-direction and x-direction respectively together form a code window of the type shown in FIG. 7, for example $F_{0,0}$.

Each window has window coordinates $F_x$, which give the position of the window in the x-direction, and $F_y$, which give the position of the window in the y-direction. Thus the correspondence between the windows and columns is as follows:

$$K_i = 3F_x$$

$$R_i = 4F_y$$

The coding is carried out in such a way that for the three differences, one of the differences $\Delta_0$ always has the value 1 or 2, which indicates the least significant digit $S_0$ for the number which represents the position of the code window in the x-direction, and the other two differences $\Delta_1$, $\Delta_2$, have values in the range 3 to 6, which indicates the two most significant digits $S_1$, $S_2$, for the coordinate of the code window. Thus no difference can be zero for the x-coordinates, as that would result in too symmetrical a code pattern. In other words, the columns are coded so that the differences are as follows:
(3 to 6); (3 to 6); (1 to 2); (3 to 6); (3 to 6); (1 to 2); (3 to 6); (3 to 6); (1 to 2); (3 to 6); (3 to 6); . . . .

Each x-coordinate is thus coded by two differences $\Delta_1$, $\Delta_2$ of between 3 and 6 and a subsequent difference $\Delta_0$ which is 1 or 2. By subtracting one (1) from the least difference $\Delta_0$ and three (3) from the other differences, three digits are obtained, $S_2$, $S_1$, $S_0$, which in a mixed base directly give the position number of the code window in the x-direction, from which the x-coordinate can then be determined directly, as shown in the example below. The position number of the code window is:

$$S_2*(4*2)+S_1*2-S_0*1$$

Using the principle described above, it is thus possible to code code windows 0, 1, 2, . . . , 31, using a position number for the code window consisting of three digits which are represented by three differences. These differences are coded by a bit pattern which is based on the number series above. The bit pattern can finally be coded graphically by means of the marks in FIG. 8.

In many cases, when a partial surface is inputted consisting of 4*4 marks, a complete position number which codes the x-coordinate will not be obtained, but parts of two position numbers, as the partial surface in many cases does not coincide with one code window but covers parts of two adjacent code windows in the x-direction. However, as the difference for the least significant digit $S_0$ of each number is always 1 or 2, a complete position number can easily be reconstructed, as it is known what digit is the least significant.

The y-coordinates are coded in accordance with approximately the same principle as that used for the x-coordinates by means of code windows. The cyclic number series, that is the same number series as is used for the x-coding, is written repeatedly in horizontal rows across the surface which is to be position coded. Precisely as for the x-coordinates, the rows are made to start in different positions, that is with different bit sequences, in the number series. For the y-coordinates, however, differences are not used, but the coordinates are coded by values which are based on the start position of the number series in each row. When the x-coordinate has been determined for a partial surface with 4*4 marks, the start positions in the number series can in fact be determined for the rows which are included in the y-code for the 4*4 marks.

In the y-code, the least significant digit $S_0$ is determined by letting this be the only digit which has a value in a particular range. In this example, one row of four starts in position 0 to 1 in the number series, in order to indicate that this row concerns the least significant digit $S_0$ in a code window, and the three other rows start in any of the positions 2 to 6 in order to indicate the other digits $S_1$ $S_2$ $S_3$ in the code window. In the y-direction there is thus a series of values as follows:
(2 to 6); (2 to 6); (2 to 6); (0 to 1); (2 to 6); (2 to 6); (2 to 6); (0 to 1); (2 to 6); . . . .

Each code window is thus coded by three values between 2 and 6 and a subsequent value between 0 and 1.

If zero (0) is subtracted from the low value and two (2) from the other values, a position in the y-direction $S_3$ $S_2$ $S_1$ $S_0$ in mixed base is obtained in a corresponding way as for the x-direction, from which the position number of the code window can be determined directly, which is:

$$S_3*(5*5*2)+S_2*(5*2)+S_i*2+S_0*1$$

Using the method above, it is possible to code 4*4*2=32 position numbers in the x-direction for the code windows. Each code window comprises bit sequences from three columns, which gives 3*32=96 columns or x-coordinates. In addition, it is possible to code 5*5*5*2=250 position numbers in the y-direction for the code windows. Each such position number comprises horizontal bit sequences from 4 rows, which gives 4*250=1000 rows or y-coordinates. In total it is thus possible to code 96000 coordinate positions.

As the x-coding is based on differences, it is, however, possible to select the position in which the first number series in the first code window is to start. If it is taken into account that this first number series can start in seven different positions, it is possible to code 7*96000=672000 positions. The start position of the first number series in the first column $K_0$ can be calculated when the x- and y-coordinates have been determined. The above seven different start positions for the first series can code different pages or writing surfaces on a product.

Theoretically, a partial surface with 4*4 symbols, which each have four values, can code $4^{4*4}$ positions, that is 4,294,967,296 positions. In order to make possible floating determination of the position of a partial surface, there is thus a redundancy factor in excess of 6000 (4294967296/672000).

The redundancy consists partly in the restrictions on the size of the differences, and partly in only 7 bits out of 16 being used in the position code. This latter fact can, however, be used to determine the rotational position of the partial surface. If the next bit in the bit series is added to the four-bit sequence, a five-bit sequence is obtained. The fifth bit is obtained by reading off the adjacent bit immediately outside the partial surface which is being used. Such an additional bit is usually easily available.

The partial surface which is read off by the sensor can have four different rotational positions, rotated through 0, 90, 180 or 270 degrees relative to the code window. In those cases where the partial surface is rotated, the reading off of the code will, however, be such that the code read off will be inverted and reversed in either the x-direction or the y-direction or both, in comparison to if it had been read off at 0 degrees. This assumes, however, that a slightly different decoding of the value of the marks is used according to the table below.

| Mark value | x-code | y-code |
|---|---|---|
| 1 | 0 | 0 |
| 2 | 1 | 0 |
| 3 | 1 | 1 |
| 4 | 0 | 1 |

The above-mentioned five-bit sequence has the characteristic that it only occurs the right way round and not in inverted and reversed form in the seven-bit series. This is apparent from the fact that the bit series (0 0 0 1 0 1 0) contains only two "ones". Therefore all five-bit sequences must contain at least three zeros, which after inversion (and any reversing) result in three ones, which cannot occur. Thus if a five-bit sequence is found which does not have a position number in the bit series, it can be concluded that the partial surface should probably be rotated and the new position tested.

In order to further illustrate the invention according to this embodiment, here follows a specific example which is based on the described embodiment of the position code.

Figure 9:
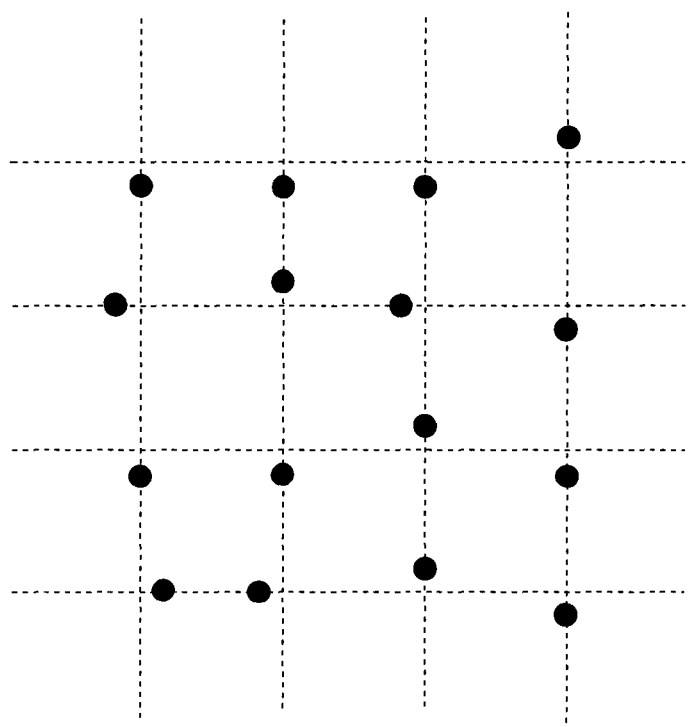
FIG. 9 is a schematic diagram that shows examples of 4*4 symbols which are used to code a position.

FIG. 9 shows an example of an image with 4*4 marks which are read off by a device for position determination.

These 4*4 marks have the following values:

```
4 4 4 2
3 2 3 4
4 4 2 4
1 3 2 4
```

These values represent the following binary x- and y-codes:

| x-code: | y-code: |
|---|---|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical bit sequences in the x-code code the following positions in the bit series: 2 0 4 6. The differences between the columns are −2 4 2, which modulo 7 gives: 5 4 2, which in mixed base codes the position number of the code window: (5-3)*8+(4-3)*2+(2-1)=16+2+1=19. The first coded code window has the position number 0. Thus the difference which lies in the range 1 to 2 and which appears in the 4*4 marks of the partial surface is the twentieth such difference. As additionally there are in total three columns for each such difference and there is a start column, the vertical sequence furthest to the right in the 4*4 x-code belongs to the 61st column (column 60) in the x-code (3*20+1=61) and the vertical sequence furthest to the left belongs to the 58th column (column 57).

The horizontal bit sequences in the y-code code the positions 0 4 1 3 in the number series. As these horizontal bit sequences start in the 58th column, the start position of the rows is these values minus 57 modulo 7, which gives the start positions 6 3 0 2. Converted to digits in mixed base, this becomes 6-2, 3-2, 0-0, 2-2=4 1 0 0, where the third digit is the least significant digit in the number concerned. The fourth digit is then the most significant digit in the next number. It must in this case be the same as in the number concerned. (The exception is when the number concerned consists of highest possible digits in all positions. Then it is known that the commencement of the next number is one larger than the commencement of the number concerned.)

The position number is in mixed base 0*50+4*10+1*2+ 0*1=42.

The third horizontal bit sequence in the y-code thus belongs to the 43rd code window which has a start position 0 or 1, and as there are four rows in total for each such code window, the third row is number 43*4=172.

In this example, the position of the top left corner of the partial surface with 4*4 marks is (58,170).

As the vertical bit sequences in the x-code in the 4*4 group start at row 170, the whole pattern's x-columns start in the number series' positions ((2 0 4 6)-169) mod 7=1 6 3 5. Between the last start position (5) and the first start position the numbers 0-19 are coded in mixed base, and by adding the representations of the numbers 0-19 in mixed base the total difference between these columns is obtained. A primitive algorithm for doing this is to generate these twenty numbers and directly add their digits. Call the sum obtained s. The page or writing surface is then given by (5-s)modulo7.

An alternative method for determining which bit is the least significant in a partial surface, in order to be able to identify a code window in this way, is as follows. The least significant bit (LSB) is defined as the digit which is the lowest in a partial surface's differences or row position number. In this way, the reduction (redundancy) of the maximum useable number of coordinates is relatively small. For example, the first code windows in the x-direction in the example above can all have LSB=1 and other digits between 2 and 6, which gives 25 code windows, the next can have LSB=2 and other digits between 3 and 6, which gives 16 code windows, the next can have LSB=3 and other digits between 4 and 6, which gives 9 code windows, the next can have LSB=4 and other digits between 5 and 6, which gives 4 code windows, the next can have LSB=5 and other digits 6, which gives 1 code window, that is a total of 55 code windows, compared to 32 in the example above.

In the example above, an embodiment has been described where each code window is coded by 4*4 marks and a number series with 7 bits is used. This is, of course, only one example. Positions can be coded by more or fewer marks. There does not need to be the same number in both directions. The number series can be of different lengths and does not need to be binary, but can be based on a different base, for example hex code. Different number series can be used for coding in the x-direction and coding in the y-direction. The marks can represent different numbers of values. The coding in the y-direction can also be carried out by differences.

In a practical example, a partial surface is used consisting of 6*6 marks and where the bit series as a maximum can consist of $2^6$ bits, that is 64 bits. However, a bit series consisting of 51 bits is used, and consequently 51 positions, in order to have the possibility of determining the rotational position of the partial surface. An example of such a bit series is: 0 0 0 0 0 1 1 0 0 0 1 1 1 1 1 0 1 0 1 0 1 1 0 1 1 0 0 1 1 0 1 0 0 0 1 0 1 0 0 1 1 1 0 1 1 1 1 0 0 1 0

Such a partial surface consisting of six by six marks can code $4^{6*6}$ positions, which with the above raster dimensions of 0.3 mm is an extremely large surface.

In a similar way as described above for the seven-bit series, according to this invention the characteristic is utilized that the partial surface is enlarged to include one bit on each side of the partial surface, at least at its center, so that for the third and fourth rows in the partial surface of 6*6 symbols, 8 symbols are read off, one on each side of the partial surface, and similarly in the y-direction. The above-mentioned bit series which contains 51 bits has the characteristic that a bit sequence of 6 bits occurs only once and that a bit sequence of 8 bits which contains said bit sequence of 6 bits occurs only once and never in an inverted position or reversed and inverted. In this way, the rotational position of the partial surface can be determined by reading off 8 bits in row 3, row 4, column 3 and/or column 4. When the rotational position is known, the partial surface can be rotated to the correct position before the processing is continued.

It is desirable to obtain a pattern which is as random as possible, that is where areas with excessive symmetry do not occur. It is desirable to obtain a pattern where a partial surface with 6*6 marks contains marks with all the different positions in accordance with FIGS. 8*a* to 8*d*. In order to increase the randomness further or avoid repetitive characteristics, a method can be used which is called "shuffle". Each bit sequence in a code window starts in a predetermined start position. However, it is possible to displace the start position in the horizontal direction for each row, if the displacement is known. This can be carried out by each least significant bit (LSB) being allocated a separate displacement vector for the adjacent rows. The displacement vector states by how much each row is displaced in the horizontal direction. Visually it can be regarded as if the y-axis in FIG. 7 is "spiky".

In the example above, with a 4*4 code window, the displacement vector can be 1, 2, 4, 0 for LSB=0 and 2, 2, 3, 0 for LSB=1. This means that after subtracting the numbers 2 and 0 respectively, the above displacement is to be subtracted (modulo five) from the bit sequence's position number, before the calculating continues. In the example above, for the y-coordinate, the digits 4 1 0 0 ($S_2$, $S_1$, $S_0$, $S_4$) are obtained in mixed base, where the second digit from the right is the least significant digit, LSB. As the displacement vector 1, 2, 4, 0 is to be used (LSB=0) for the digits 4 and 1, 2 is subtracted from 4 to give $S_2$=2 and 4 is subtracted from 1 (modulo five) to give $S_1$=2. The digit $S_0$=0 remains unchanged (the displacement vector's component for the least significant digit is always zero). Finally, the digit $S_4$ belongs to the next code window, which must have LSB=1, that is the second displacement vector is to be used. Thus 2 is subtracted from 0 (modulo five) which gives $S_4$=3.

A similar method can be used to change the codes for the x-coordinates. However, there is less need to change the x-coordinates, as they are already relatively randomly distributed, as the difference zero is not used, in the example above.

In the example above, the mark is a dot. Naturally it can have a different appearance. It can, for example, consist of a line or an ellipse, which starts at the virtual raster point and extends from this to a particular position. Other symbols than a dot can be used, such as a square, rectangle, triangle, circle or ellipse, filled-in or not.

In the example above, the marks are used within a square partial surface for coding a position. The partial surface can be another shape, for example hexagonal. The marks do not need to be arranged along the raster lines in an orthogonal raster but can also have other arrangements, such as along the raster lines in a raster with 60 degree angles, etc. A polar coordinate system can also be used.

Rasters in the form of triangles or hexagons can also be used. For example, a raster with triangles enables each mark to be displaced in six different directions, which provides even greater possibilities, corresponding to $6^{6*6}$ partial surface positions. For a hexagonal raster, a honeycomb pattern, each mark can be displaced in three different directions along the raster lines.

As mentioned above, the marks do not need to be displaced along the raster lines but can be displaced in other directions, for example in order to be located each in a separate quadrant of a square raster pattern. In the hexagonal raster pattern the marks can be displaced in four or more different directions, for example in six directions along the raster lines and along lines which make 60 degrees with the raster lines.

In order for the position code to be detected, it is necessary for the virtual raster to be determined. This can be carried out, in a square raster pattern, by examining the distance between the different marks. The shortest distance between two marks must originate from two adjacent marks with the values 1 and 3 in the horizontal direction or 2 and 4 in the vertical direction, so that the marks lie on the same raster line between two raster points. When such a pair of marks has been detected, the associated raster points (the nominal positions) can be determined using knowledge of the distance between the raster points and the displacement of the marks from the raster points. Once two raster points have been located, additional raster points can be determined using the measured distance to other marks and from knowledge of the distance between the raster points.

If the marks are displaced 50 µm along the raster lines, which are a distance of 300 µm apart, the least distance between two marks will be 200 µm, for example between marks with the values 1 and 3. The next smallest distance arises between, for example, marks with the values 1 and 2, and is 255 µm. There is therefore a relatively distinct difference between the least and the next smallest distance. The difference in any diagonals is also great. However, if the displacement is larger than 50 µm, for example more than 75 µm (¼), diagonals can cause problems and it can be difficult to determine to which nominal position a mark belongs. If the displacement is less than 50 µm, for example less than approximately 35 µm (⅛), the least distance will be 230 µm, which does not give a very large difference to the next distance, which is then 267 µm. In addition, the demands on the optical reading off increase.

The marks should not cover their own raster point and should therefore not have a larger diameter than twice the displacement, that is 200%. This is, however, not critical, and a certain overlapping can be permitted, for example 240%. The least size is determined initially by the resolution of the sensor and the demands of the printing process used to reproduce the pattern. However, the marks should not have a smaller diameter than approximately 50% of the displacement in practice, in order to avoid problems with particles and noise in the sensor.

In the embodiment above, the raster is an orthogonal grid. It can also have other forms, such as a rhombic grid, for example with 60 degree angles, a triangular or hexagonal grid, etc.

Displacement in more or less than four directions can be used, for example displacement in three directions along a hexagonal virtual raster. In an orthogonal raster only two displacements can be used, in order to facilitate the recreation of the raster. However, a displacement in four directions is preferred, but six or eight directions are also possible.

In the embodiment above, the longest possible cyclic number series is not used. Thus a degree of redundancy is obtained, which can be used in various ways, for example to carry out error correcting, replace missing or hidden marks, etc.

What we claim and desire to secure by Letters Patent is:

1. A digital pen for processing position information associated with a product, the position information being a subset of a predefined position-coding pattern, the digital pen comprising:
    a memory storing a template that correlates selected position information with at least one predefined field, the memory further storing an operation associated with the predefined field, wherein the template further includes information that defines a logical layout and size common to a plurality of pages, the logical layout including said at least one predefined field;
    a sensor detecting position information from a product; and
    a processor determining whether the position information detected by the sensor corresponds to the at least one predefined field, the processor initiating the associated operation when the detected position information corresponds to the predefined field by processing at least a portion of the subset of the predefined position-coding pattern independent of use of an external device.

2. The digital pen of claim 1, wherein the logical layout includes a plurality of predefined fields, and wherein the memory stores a plurality of operations, each operation being associated with at least one of the plurality of predefined fields.

3. The digital pen of claim 2, wherein the memory stores a plurality of templates, and wherein each of the plurality of templates defines a differing logical layout.

4. The digital pen of claim 1, wherein the template correlates selected position information with a plurality of predefined fields, the memory stores operations associated with each of the plurality of predefined fields, and the processor initiates an associated operation when the detected position information corresponds to a selected predefined field.

5. The digital pen of claim 4, wherein the stored operations include a plurality of differing types of operations.

6. The digital pen of claim 1, wherein the memory stores the template in an algorithm-based database.

7. The digital pen of claim 1, wherein the predefined field is a send field, and wherein the operation associated with the send field is an instruction to send the detected position information to an external unit.

8. The digital pen of claim 1, wherein the operation associated with the predefined field is one of an instruction to send the detected position information to a predetermined address, an instruction to perform character recognition on the detected position information, an instruction to directly send the detected position information to an external unit, an instruction to store the detected position information, and an instruction to store the detected position information for a predetermined period of time.

9. A method for processing position information associated with a product, the position information being a subset of a predefined position-coding pattern, the method being executed by a digital pen and comprising:

detecting position information associated with a product using a sensor on the digital pen;

accessing a template that correlates selected position information with at least one predefined field, the template being stored within a memory of the digital pen and including information that defines a logical layout and size common to a plurality of pages, the logical layout including said at least one predefined field;

determining whether the detected position information corresponds to the at least one predefined field of the template; and initiating at least one operation associated with the at least one predefined field when the detected position information corresponds to the predefined field of the template, wherein the at least one operation is stored in the memory of the digital pen and is initiated by processing at least a portion of the subset of the predefined position-coding pattern independent of use of an external device.

10. The method of claim 9, further comprising selecting the template from a plurality of templates stored in the memory of the digital pen.

11. The method of claim 9, wherein the initiating at least one operation includes initiating a send instruction to send the detected position information to an external unit.

12. The method of claim 9, wherein the initiating at least one operation includes initiating a send instruction to send the detected position information to a predetermined address.

13. The method of claim 9, wherein the initiating at least one operation includes initiating a processing instruction to perform character recognition on the detected position information.

14. The method of claim 9, wherein the initiating at least one operation includes initiating a storing instruction to store the detected position information.

* * * * *